(12) United States Patent
Hargreaves et al.

(10) Patent No.: US 10,430,633 B2
(45) Date of Patent: Oct. 1, 2019

(54) PIXEL ARCHITECTURE AND DRIVING SCHEME FOR BIOMETRIC SENSING

(71) Applicant: SYNAPTICS INCORPORATED, San Jose, CA (US)

(72) Inventors: Kirk Hargreaves, Mountain View, CA (US); Arash Akhavan Fomani, Sunnyvale, CA (US); Patrick Smith, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 110 days.

(21) Appl. No.: 15/612,250

(22) Filed: Jun. 2, 2017

(65) Prior Publication Data
US 2018/0204037 A1 Jul. 19, 2018

Related U.S. Application Data

(63) Continuation-in-part of application No. 15/406,109, filed on Jan. 13, 2017, now Pat. No. 10,216,972.

(51) Int. Cl.
*G06K 9/00* (2006.01)
(52) U.S. Cl.
CPC .................. *G06K 9/0002* (2013.01)
(58) Field of Classification Search
CPC ........ G06K 9/0002; G06F 2203/04105; G06F 2203/04112; G06F 3/044; G01R 27/2605; H03K 17/962
USPC ....................................................... 382/124
See application file for complete search history.

(56) References Cited

U.S. PATENT DOCUMENTS

| | | | |
|---|---|---|---|
| 4,429,413 A | 1/1984 | Edwards | |
| 5,325,442 A | 6/1994 | Knapp | |
| 5,978,496 A | 11/1999 | Harkin | |
| 6,411,727 B1 | 6/2002 | Harkin | |
| 6,657,269 B2 | 12/2003 | Migliorato et al. | |
| 6,681,033 B1 | 1/2004 | Yano et al. | |
| 6,937,031 B2 | 8/2005 | Yoshioka et al. | |
| 7,053,633 B2 | 5/2006 | Hara | |
| 7,078,917 B2 | 7/2006 | Yoshida et al. | |
| 7,081,765 B2 | 7/2006 | Miyasaka et al. | |
| 7,091,726 B2 | 8/2006 | Sano et al. | |
| 7,126,349 B2 | 10/2006 | Hara | |
| 7,126,350 B2 | 10/2006 | Miyasaka | |

(Continued)

FOREIGN PATENT DOCUMENTS

WO    WO-2014014785 A1    1/2014

OTHER PUBLICATIONS

International Search Report and Written Opinion PCT/US2016/039231, dated Oct. 12, 2016, consists of 14 pages.

*Primary Examiner* — Ali Bayat
(74) *Attorney, Agent, or Firm* — Patterson + Sheridan, LLP

(57) ABSTRACT

Embodiments herein describe an input device that includes a rectangular array of sensor electrodes connected to sensor modules that measure capacitive sensing signals corresponding to the electrodes. When performing code division multiplexing (CDM), multiple sensor electrodes are coupled to the same sensor module. As such, the sensor module generates a measurement that represents the sum of the charges on the sensor electrodes rather than an individual charge on a single sensor electrode. By repeatedly sensing multiple sensor electrodes in parallel, the input device can determine a change of capacitance for each individual sensor electrode.

8 Claims, 15 Drawing Sheets

(56) References Cited

U.S. PATENT DOCUMENTS

| | | |
|---|---|---|
| 7,127,089 B2 | 10/2006 | Miyasaka |
| 7,196,528 B2 | 3/2007 | Ebihara |
| 7,683,638 B2 | 3/2010 | Chuang et al. |
| 7,683,639 B2 | 3/2010 | Chuang et al. |
| 7,683,640 B2 | 3/2010 | Chuang et al. |
| 7,755,369 B2 | 7/2010 | Chuang et al. |
| 8,711,128 B2 | 4/2014 | Small et al. |
| 8,766,950 B1 | 7/2014 | Morein et al. |
| 2004/0169755 A1 | 9/2004 | Shinotsuka |
| 2005/0163351 A1 | 7/2005 | Kim et al. |
| 2007/0176609 A1* | 8/2007 | Ely ............... G06F 3/044 324/678 |
| 2008/0007507 A1 | 1/2008 | Kim et al. |
| 2010/0072471 A1 | 3/2010 | Yamazaki et al. |
| 2010/0098303 A1 | 4/2010 | Chen |
| 2010/0193257 A1 | 8/2010 | Hotelling et al. |
| 2010/0219845 A1 | 9/2010 | Easter |
| 2011/0090184 A1 | 4/2011 | Yamazaki et al. |
| 2011/0148435 A1* | 6/2011 | Schwartz ......... G06F 3/0416 324/658 |
| 2011/0298746 A1 | 12/2011 | Hotelling |
| 2012/0206154 A1 | 8/2012 | Pant et al. |
| 2013/0057511 A1 | 3/2013 | Shepelev et al. |
| 2013/0215075 A1 | 8/2013 | Lee et al. |
| 2013/0249850 A1 | 9/2013 | Bulea |
| 2013/0314148 A1 | 11/2013 | Kang et al. |
| 2014/0146000 A1 | 5/2014 | Jo et al. |
| 2014/0266262 A1 | 9/2014 | Taghibakhsh |
| 2014/0354596 A1 | 12/2014 | Djordjev et al. |
| 2015/0077389 A1 | 3/2015 | Ding et al. |
| 2015/0091850 A1 | 4/2015 | Morein et al. |
| 2015/0177868 A1 | 6/2015 | Morein et al. |
| 2015/0378467 A1 | 12/2015 | Hoch |
| 2016/0092000 A1 | 3/2016 | Morein et al. |
| 2017/0003770 A1 | 1/2017 | Akhavan Fomani et al. |
| 2017/0003777 A1 | 1/2017 | Akhavan Fomani et al. |
| 2017/0006245 A1 | 1/2017 | Akhavan Fomani et al. |
| 2017/0038866 A1 | 2/2017 | Akhavan Fomani et al. |
| 2017/0068838 A1* | 3/2017 | Kravets ............ G06F 3/044 |
| 2017/0147141 A1 | 5/2017 | Khazeni et al. |
| 2017/0364174 A1* | 12/2017 | Pedersen ......... G06F 3/044 |

* cited by examiner

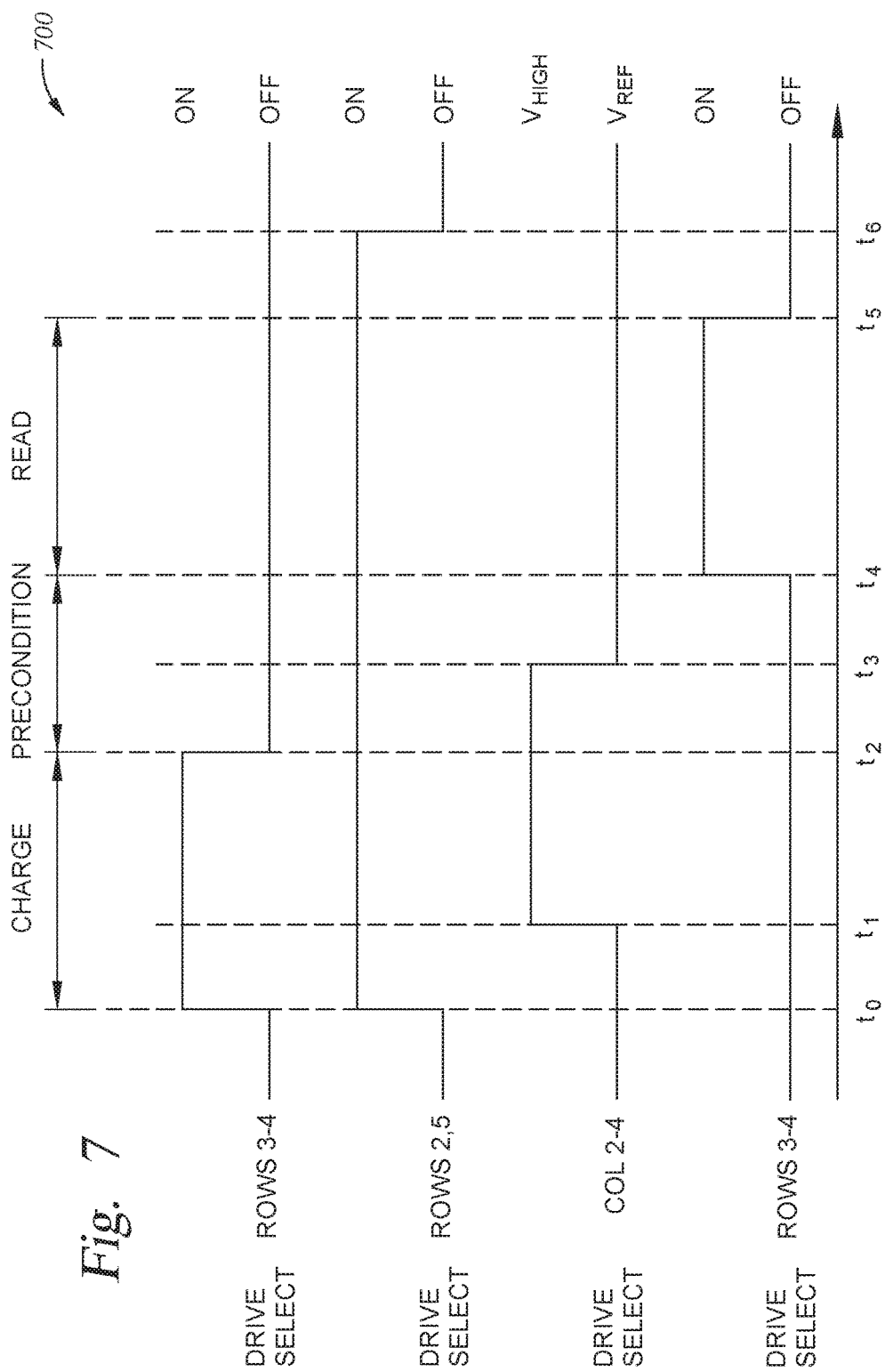

ID AND DRIVING
PIXEL ARCHITECTURE AND DRIVING SCHEME FOR BIOMETRIC SENSING

CROSS-REFERENCE TO RELATED APPLICATIONS

This application is a continuation-in-part of co-pending U.S. patent application Ser. No. 15/406,109, filed Jan. 13, 2017. The aforementioned related patent application is herein incorporated by reference in its entirety.

FIELD OF THE INVENTION

This invention generally relates to electronic devices and performing capacitive sensing.

BACKGROUND

Many input devices include a fingerprint sensor that uses capacitive sensing to detect a fingerprint of a user. A fingerprint sensor typically includes a sensing region in which the fingerprint sensor determines the ridges and valley of a finger. In one example, the sensing region includes sensor electrodes used to measure changes in capacitance resulting from a finger interacting with the sensing region. However, common mode coupling due to capacitance between a sensor electrode and neighboring sensor electrodes can interfere with measuring capacitance values between the sensor electrode and the finger which is especially the case with fingerprint sensors which measure signals with small magnitudes. In addition, the input device may have parasitic capacitances corresponding to an output line used to drive signals on the sensor electrode which can be orders of magnitude larger than the capacitance between the sensor electrode and the finger. The effects of the common mode coupling and the parasitic capacitance make measuring the smaller capacitance between the sensing electrode and the finger more difficult.

BRIEF SUMMARY OF THE INVENTION

One embodiment described herein includes a processing system for operating an input device comprising a plurality of sensor electrodes disposed in an array, wherein a first sensor electrode and a second sensor electrode of the plurality of sensor electrodes are disposed in a same column in the array. The processing system includes a controller circuit configured to charge the first sensor electrode to a first voltage, charge the second sensor electrode to a second voltage different from the first voltage, wherein the first and second voltages are assigned to the first and second sensor electrodes according to a code division multiplexing (CDM) technique, and, after charging the first and second sensor electrodes, couple the first and second sensor electrodes simultaneously to a same analog front end (AFE) to sense a combined charge on the first and second sensor electrodes.

Another embodiment described herein includes an input device that includes a plurality of sensor electrodes disposed in columns forming an array where each column comprises a sense line coupled to an AFE and respective transistors selectively coupling the plurality of sensor electrodes in the column to the sense line and a processing system. The processing system is configured to charge at least one of the plurality of sensor electrodes in at least one of the columns to a first voltage and after charging the at least one of the plurality of sensor electrodes: couple the at least one of the plurality of sensor electrodes to the sense line by activating one of the respective transistors, deactivate an offset transistor coupled to the sense line to mitigate a charge injected by activating the one of the respective transistors, and measure a charge on the at least one of the plurality of sensor electrodes using the AFE after deactivating the offset transistor.

Another embodiment described herein is a processing system for operating an input device comprising a plurality of sensor electrodes disposed in columns forming an array where each column comprises a sense line coupled to an AFE and respective transistors selectively coupling the plurality of sensor electrodes in the column to the sense line. The processing system includes a controller configured to charge at least one of the plurality of sensor electrodes in at least one of the columns to a first voltage and after charging the at least one of the plurality of sensor electrodes: couple the at least one of the plurality of sensor electrodes to the sense line by activating one of the respective transistors and deactivate an offset transistor coupled to the sense line to mitigate a charge injected by activating the one of the respective transistors. The processing system includes a sensor module comprising the AFE, the sensor module is configured to measure a charge on the at least one of the plurality of sensor electrodes using the AFE after the offset transistor is deactivated.

Another embodiment described herein includes an input device that includes a plurality of sensor electrodes disposed in columns forming an array, wherein each column comprises a sense line coupled to an AFE and respective transistors selectively coupling the plurality of sensor electrodes in the column to the sense line. The AFE is configured to charge a first sensor electrode in at least one of the columns to a first voltage, charge a second sensor electrode in the column to a second voltage different from the first voltage, and, after charging the first and second sensor electrodes, measure a combined charge on the first and second sensor electrodes in parallel.

BRIEF DESCRIPTION OF DRAWINGS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 7 is a timing diagram corresponding to the sensor layout shown in FIG. 6A in accordance with an embodiment of the invention;

Figure 1:
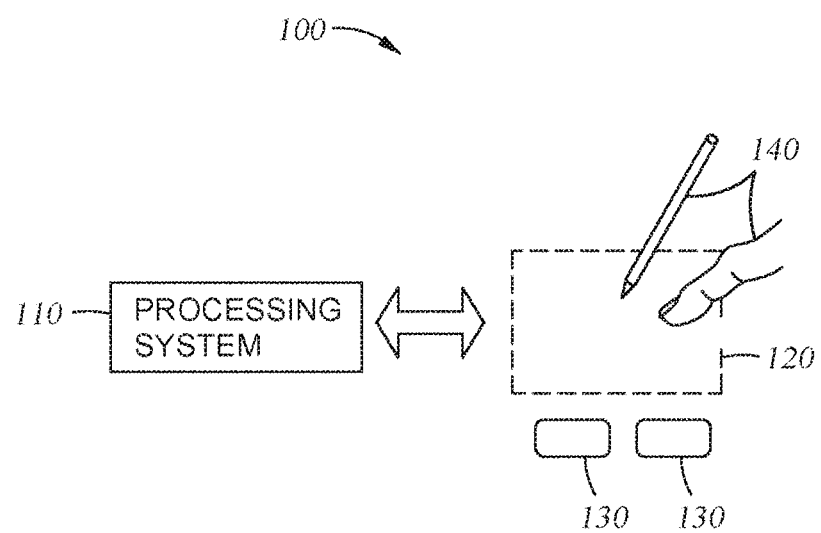
FIG. 1 is a block diagram of an exemplary system that includes an input device in accordance with an embodiment of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability. In one embodiment, the input device includes a matrix sensor which, as defined herein, includes a plurality of sensor electrodes arranged in an array on a common surface or plane. The input device may include a plurality of sensor modules connected to the sensor electrodes via switches that measure capacitive sensing signals corresponding to the electrodes. During a charge stage, the input device applies a charging voltage to at least one of the electrodes in the matrix sensor. If a code division multiplexing (CDM) scheme is used, the input device applies the charging voltage to a plurality of sensor electrodes connected to the same sense line. The amount of charge accumulated on the selected sensor electrode (or electrodes) depends on the capacitive coupling between the sensor electrode and an input object (e.g., a finger). During a read stage, the input device measures the amount of charge accumulated on the one or more sensor electrodes during the charge stage. In one embodiment, the measured charge can be correlated to a particular feature of an input object. For example, when used as a fingerprint sensor, the input device can detect valleys and ridges in a finger depending on the measured charge.

The capacitive coupling between a selected sensor electrode and the input object, however, is not the only capacitance that can affect the amount of charge stored on the sensor electrode during the charge stage. The capacitive coupling between the selected sensor electrode and the neighboring sensor electrodes in the matrix sensor when used as a fingerprint sensor can be on the same order of magnitude as the difference of the capacitive coupling between a ridge in the finger to the selected electrode and the capacitive coupling between a valley in the finger to the selected electrode. Because this capacitive coupling can make measuring the charge attributable to the capacitive coupling to the input object more difficult, embodiments herein drive the neighboring electrodes in the same manner as the selected sensor electrode or electrodes. In one embodiment, during the charge stage, the selected electrode (also referred to herein as the "sensed electrode") and the neighboring electrodes are connected to the charge voltage. Because there is no voltage difference between these electrodes, the capacitive coupling to the neighboring electrodes does not affect the amount of charge stored on the selected electrode during the charge stage. Similarly, during the read stage, the neighboring electrodes and the selected electrode may be biased to the same reference voltage—e.g., ground—so there is again no voltage difference between the electrodes. In this manner, the effects of the parasitic capacitance between the selected sensor electrode and its neighbors can be mitigated or removed.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1. In one embodiment, the input device 100 is a fingerprint sensor that senses the different features in a finger such as ridges and valleys which can be used to form a fingerprint. The fingerprint sensor may be a swipe sensor, where a fingerprint image is reconstructed from a series of scans as the user moves their finger over the sensor, or a placement sensor, where a sufficient area of the fingerprint can be captured from a single scan as the user holds her finger at a fixed location in the sensing region 120.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. In another embodiment, the sensing region 120 has a circular shape that conforms to the shape of a fingertip.

The input device 100 may utilize any combination of sensor components and sensing technologies to detect user input in the sensing region 120. The input device 100 comprises one or more sensing elements for detecting user input.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes (e.g., unlocking the user device or providing access to secure data using a detected fingerprint), as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
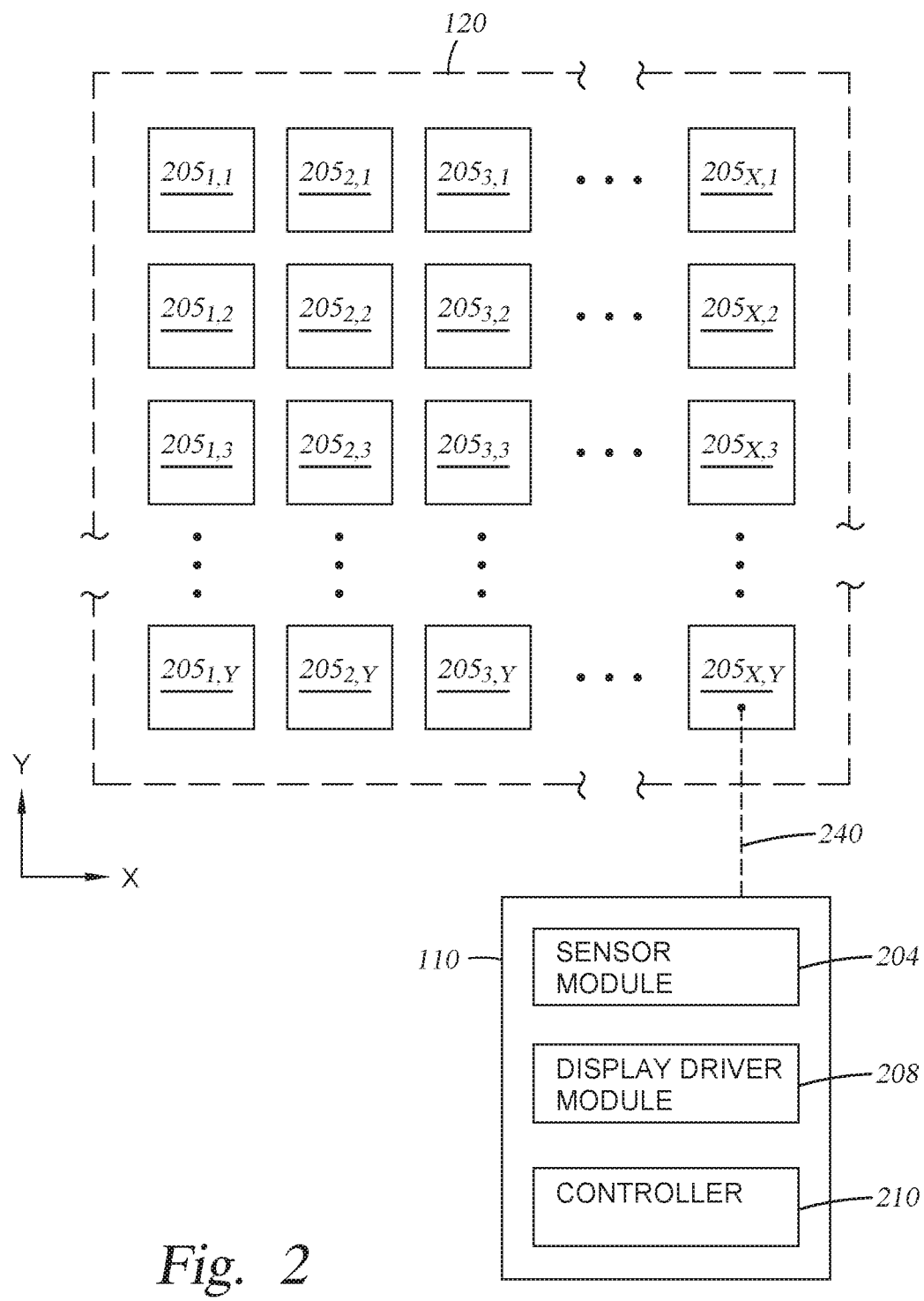
FIG. 2 is input device that includes a matrix sensor arrangement in accordance with an embodiment of the invention.

FIG. 2 shows a portion of an exemplary pattern of capacitive sensing pixels 205 (also referred to herein as capacitive pixels or sensing pixels) configured to sense in the sensing region 120 associated with a pattern, according to some embodiments. Each capacitive pixel 205 may include one of more of the sensing elements described above. For clarity of illustration and description, FIG. 2 presents the regions of the capacitive pixels 205 in a pattern of simple rectangles and does not show various other components within the capacitive pixels 205. In one embodiment, the capacitive sensing pixels 205 are areas of localized capacitance (capacitive coupling). Capacitive pixels 205 may be formed between an individual sensor electrode and ground in a first mode of operation and between groups of sensor electrodes used as transmitter and receiver electrodes in a second mode of operation. The capacitive coupling changes with the proximity and motion of input objects in the sensing region 120 associated with the capacitive pixels 205, and thus may be used as an indicator of the presence of the input object in the sensing region 120 of the input device or to detect ridges and valleys when used as a fingerprint sensor.

The exemplary pattern comprises an array of capacitive sensing pixels 205X,Y (referred collectively as pixels 205) arranged in X columns and Y rows in a common plane, wherein X and Y are positive integers, although one of X and Y may be zero. It is contemplated that the pattern of sensing pixels 205 may comprises a plurality of sensing pixels 205 having other configurations, such as polar arrays, repeating patterns, non-repeating patterns, non-uniform arrays a single row or column, or other suitable arrangement. Further, as will be discussed in more detail below, the sensor electrodes in the sensing pixels 205 may be any shape such as circular, rectangular, diamond, star, square, noncovex, convex, non-concave concave, etc. As shown here, the sensing pixels 205 are coupled to the processing system 110.

In a first mode of operation, at least one sensor electrode within the capacitive sensing pixels 205 may be utilized to detect the presence of an input object via absolute sensing techniques. A sensor module 204 (e.g., a sensor circuit) in processing system 110 is configured to drive a sensor electrode using a trace 240 in each pixel 205 with a capacitive sensing signal (which can be modulated or unmodulated) and measure a capacitance between the sensor electrode, and the input object (e.g., free space or earth ground) based on the capacitive sensing signal, which is utilized by the processing system 110 or other processor to determine the position of the input object or features in a finger.

The various electrodes of capacitive pixels 205 are typically ohmically isolated from the electrodes of other capacitive pixels 205. Additionally, where a pixel 205 includes multiple electrodes, the electrodes may be ohmically isolated from each other. That is, one or more insulators separate the sensor electrodes and prevent them from electrically shorting to each other.

In a second mode of operation, sensor electrodes in the capacitive pixels 205 are utilized to detect the presence of an input object via transcapacitance sensing techniques. That is, processing system 110 may drive at least one sensor electrode in a pixel 205 with a transmitter signal and receive resulting signals using one or more of the other sensor electrodes in the pixel 205, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

In some embodiments, the capacitive pixels 205 are "scanned" to determine these capacitive couplings. That is, in one embodiment, one or more of the sensor electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes configured as receiver sensor electrodes may be operated singly or multiply to acquire resulting signals. The resulting signals may be used to determine measurements of the capacitive couplings at the capacitive pixels 205.

In other embodiments, "scanning" pixels 205 to determine these capacitive coupling includes driving with a modulated signal and measuring the absolute capacitance of one or more of the sensor electrodes. In another embodiment, the sensor electrodes may be operated such that the modulated signal is driven on a sensor electrode in multiple capacitive pixels 205 at the same time. In such embodiments, an absolute capacitive measurement may be obtained from each of the one or more pixels 205 simultaneously. In one embodiment, the input device 100 simultaneously drives a sensor electrode in a plurality of capacitive pixels 205 and measures an absolute capacitive measurement for each of the pixels 205 in the same sensing cycle. In various embodiments, processing system 110 may be configured to selectively drive and receive with a portion of sensor electrodes. For example, the sensor electrodes may be selected based on, but not limited to, an application running on the host processor, a status of the input device, an operating mode of the sensing device and a determined location of an input object. In another embodiment, the input object (e.g., a finger) is the transmitter that is driven with the modulated signal while the sensor electrode is a receiver.

A set of measurements from the capacitive pixels 205 form a capacitive image (also capacitive frame) representative of the capacitive couplings at the pixels 205 as discussed above. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more of the sensor electrodes in the capacitive pixels 205 include one or more display electrodes used in updating the display of the display screen. In one or more embodiments, the display electrodes comprise one or more segments of a Vcom electrode (common electrodes), a source drive line, gate line, an anode electrode or cathode electrode, or any other display element. These display electrodes may be disposed on an appropriate display screen substrate. For example, the electrodes may be disposed on the a transparent substrate (a glass substrate, TFT glass, a plastic substrate or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, an electrode that is used as both a sensor and a display electrode can also be referred to as a combination electrode, since it performs multiple functions.

Continuing to refer to FIG. 2, the processing system 110 coupled to the sensing electrodes includes a sensor module 204 and optionally, a display driver module 208. In one embodiment the sensor module comprises circuitry configured to drive a transmitter signal onto and receive resulting signals with the resulting signals the sensing electrodes during periods in which input sensing is desired. In one embodiment the sensor module 204 includes a transmitter module including circuitry configured to drive a transmitter signal onto the sensing electrodes during periods in which input sensing is desired. The transmitter signal is generally modulated and contains one or more bursts over a period of time allocated for input sensing. The transmitter signal may have an amplitude, frequency and voltage which may be changed to obtain more robust location information of the input object in the sensing region. The modulated signal used in absolute capacitive sensing may be the same or different from the transmitter signal used in transcapacitance sensing. The sensor module 204 may be selectively coupled to one or more of the sensor electrodes in the capacitive pixels 205. For example, the sensor module 204 may be coupled to selected portions of the sensor electrodes and operate in either an absolute or transcapacitance sensing mode. In another example, the sensor module 204 may be coupled to different sensor electrodes when operating in the absolute sensing mode than when operating in the transcapacitance sensing mode.

In various embodiments the sensor module 204 may comprise a receiver module that includes circuitry configured to receive a resulting signal with the sensing electrodes comprising effects corresponding to the transmitter signal during periods in which input sensing is desired. In one or more embodiments, the receiver module is configured to drive a modulated signal onto a first sensor electrode in one of the pixels 205 and receive a resulting signal corresponding to the modulated signal to determine changes in absolute capacitance of the sensor electrode. The receiver module may determine a position of the input object in the sensing region 120 or may provide a signal including information indicative of the resulting signal to another module or processor, for example, a determination module or a processor of the electronic device (e.g., a host processor), for determining the position of the input object in the sensing region 120. In one or more embodiments, the receiver module comprises a plurality of receivers, where each receiver may be an analog front ends (AFEs).

In one or more embodiments, capacitive sensing (or input sensing) and display updating may occur during at least partially overlapping periods. For example, as a combination electrode is driven for display updating, the combination electrode may also be driven for capacitive sensing. Or overlapping capacitive sensing and display updating may include modulating the reference voltage(s) of the display device and/or modulating at least one display electrode for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes for capacitive sensing during any one or more of or any combination of the different non-display update times.

The display driver module 208 includes circuitry confirmed to provide display image update information to the display of the display device during non-sensing (e.g., display updating) periods. The display driver module 208 may be included with or separate from the sensor module 204. In one embodiment, the processing system comprises a first integrated circuit comprising the display driver module 208 and at least a portion of the sensor module 204 (i.e., transmitter module and/or receiver module). In another embodiment, the processing system comprises a first integrated circuit comprising the display driver module 208 and a second integrated circuit comprising the sensor module 204. In yet another embodiment, the processing system comprises a first integrated circuit comprising a display driver module 208 and one of a transmitter module or a receiver module and a second integrated circuit comprising the other one of the transmitter module and receiver module.

The processing system 110 further includes a controller circuit 210 for controlling the voltages driven onto the sensor electrodes in the pixels 205. As described in more detail below, the controller circuit 210 may include logic circuitry for activating switches (e.g., transistors) to connect the sensor electrodes to drive lines to drive voltages onto the sensor electrodes and to sense lines for deriving a capacitive measurement for the sensor electrodes.

Figure 3:
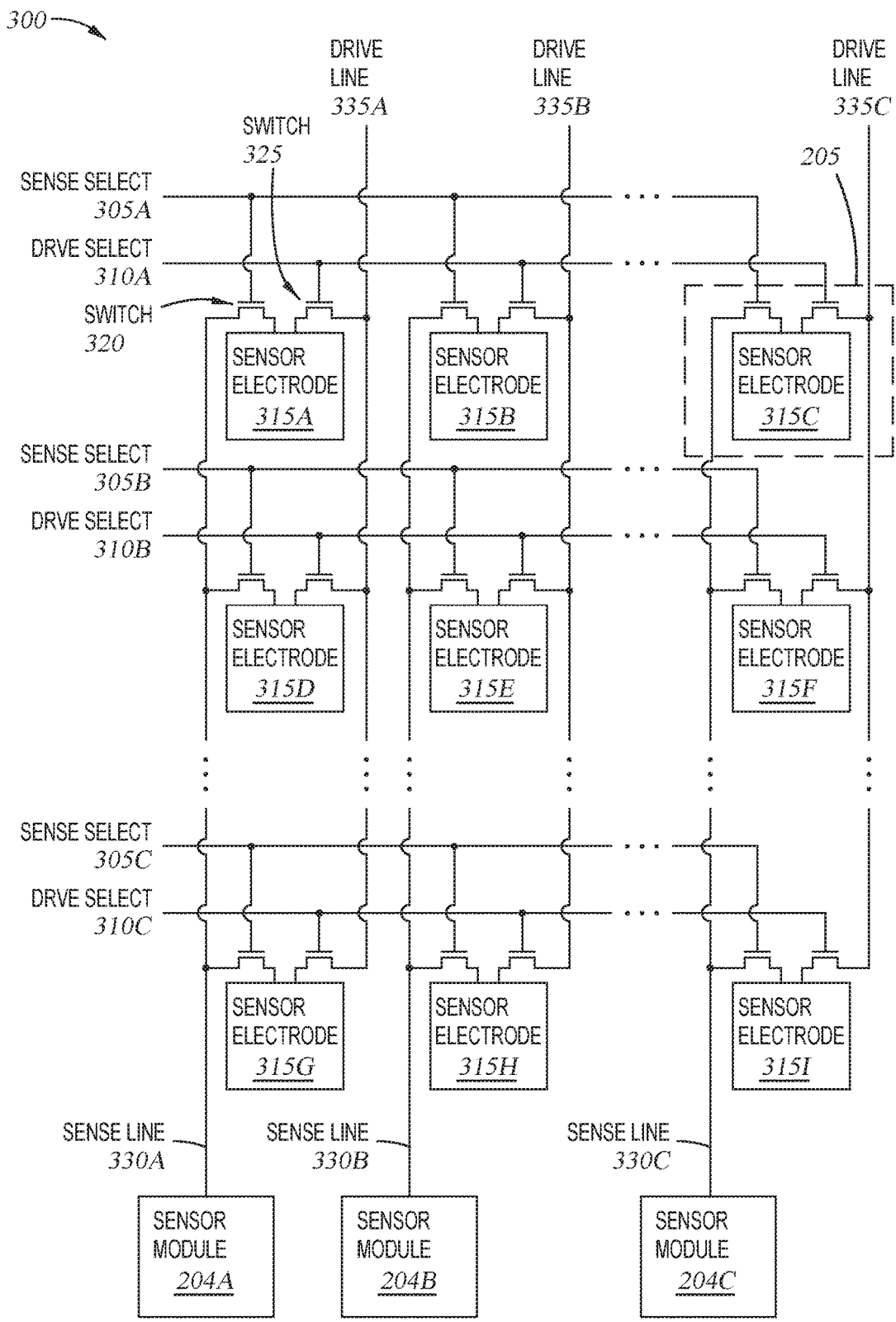
FIG. 3 illustrates a sensor layout for detecting an input object in accordance with an embodiment of the invention.

FIG. 3 illustrates a sensor layout 300 for detecting an input object in accordance with an embodiment of the invention. Although the discussion that follows describes the sensor layout being used in a fingerprint sensor, the embodiments described herein are not limited to such. In other embodiments, the components illustrated in FIG. 3 may be used in a capacitive sensing sensor for detecting a position of an input object in a sensing region, whether an input object is hovering over a touch surface, a palm print, or hand geometry.

As shown, the sensor layout 300 includes multiple sensor electrodes 315 which may each form a capacitive sensing pixel 205 as described above. The sensor electrodes 315 are arranged to form a fingerprint sensor array. As shown, the sensor electrodes 315 are arranged in a matrix pattern that forms a rectangular array. The sensor electrodes 315 are co-planar and disposed on a common substrate. In one embodiment, the width and height of the sensor electrodes 315 may range from 5 microns to 70 microns. Furthermore, the pitch between the sensor electrodes 315 is set to enable the sensor layout 300 to detect features in a finger such as valleys and ridges. For example, the pitch between sensor electrodes 315 may range from 5 to 100 microns.

Each sensor electrode 315 is coupled to respective switches 320, 325 (e.g., transistors). The switches 320, 325 are controlled (i.e., activated and deactivated) by sense select lines 305 and drive select lines 310 which, in one embodiment, are controlled by the controller circuit 210 shown in FIG. 2. As shown, each row in the sensor layout 300 includes a respective pair of the select lines 305, 310. For example, each of the switches 320 and 325 in the upper row are coupled to the sense select line 305A and the drive select line 310A. The switches 320 and 325 in the middle row are coupled to the sense select line 305B and the drive select line 310B, and so forth.

In one embodiment, the sensor electrodes 315 are disposed on a different substrate in the fingerprint sensor than the switches 320, 325 and the select lines 305, 310. For example, the electrodes 315 may be disposed on a first substrate above a second substrate on which the switches 320, 325 are disposed in a display stack. The first substrate may include through vias to electrically couple the electrodes 315 to the switches 320, 325. In another embodiment, the sensor electrodes 315, switches 320, 325, and select lines 305, 310 are disposed on a common substrate. For example, these components may be disposed on the same side of the common substrate. However, in another example, the sensor electrodes 315 may be disposed on a first side of the common substrate while the switches 320, 325 and select lines 305, 310 are disposed on a second, opposite side of the common substrate.

In one embodiment, the switches 320, 325 are formed using thin-film-transistors (TFT). However, in another embodiment, the switches 320, 325 may be implemented using CMOS transistors. As such the sensor layout 300 may be used in a display stack where switches 320, 325 and sensor electrodes 315 are formed using transparent materials (e.g., transparent TFT) or the sensor layout 300 may be used outside a display stack where the switches 320, 325 or sensor electrodes 315 are not transparent (e.g., CMOS technologies or non-transparent TFTs).

The select lines 305, 310 activate the switches 320, 325 which connect the sensor electrodes 315 to either a sense line 330 or a drive line 335. While the switches 320, 325 in the same row of electrodes 315 are all coupled to the same pair of select lines 305, 310, the switches 320 in the same column of electrodes 315 are all coupled to the same sense line 330 (also referred to as an output line) while the switches 325 in the same column of electrodes 315 are all coupled to the same drive line 335. When the select line 305A activates the switches 320 in the upper row, each of the electrodes 315 in the upper row (i.e., electrodes 315A, 315B, and 315C) are connected to their respective sense lines 330. If only one of the sense select lines 305 is active at any given time, then only one electrode 315 in each column is connected to a sense line 330. For example, if select line 305A is high, but select lines 305B and 305C are low, then only sensor electrodes 315A-C are connected to the sense lines 330 while electrodes 315D-I are not.

However, when using CDM to perform capacitive sensing, the input device may sense from multiple sensor electrodes 315 in the same column simultaneously. As shown, the sense lines 330 are coupled to respective sensor modules 204. Using CDM, a sensor module 204 can determine the charge stored on multiple sensor electrodes 315 simultaneously. In one embodiment, the sensor modules 204 include integrators that integrate charge stored on multiple sensor electrodes connected to the same sense line 330. That is, the sensor modules 204 can sum up the charge stored in the sensor electrodes 315. By repeatedly sensing multiple sensor electrodes 315 in parallel, the input device can then determine a change of capacitance for each individual sensor electrode 315. In one embodiment, the fingerprint sensor uses an N number of combinations of the sensor electrodes 315 to determine the individual charge stored on an N number of the sensor electrodes 315. For example, the fingerprint sensor may sense the sum of the sensor electrodes 315 on row 1, row 5, and row 6 on the same column during a first time period and then sense the sum of the sensor electrodes 315 on row 1, row 2, and row 5 during a second time period. By using an N number of combinations (where N is equal to or greater than the number of sensor electrodes 315 to be sensed), the input device can determine the individual charge stored on each of the sensor electrodes 315. That is, although with CDM the sensor modules evaluate the charge stored on multiple sensor electrodes simultaneously, backend calculations can be performed to determine the individual charge (or change in charge) corresponding to each sensor electrodes 315. Moreover, in one embodiment, the sensor electrodes 315 in the same column can be charged to both negative and positive voltages. For example, the sensor electrode 315 at row 1 (as well as its neighboring electrodes) could be charged to a negative voltage while the sensor electrodes 315 at row 6 on the same column (and its neighboring electrodes) could be charged to a positive voltage. By summing the stored charges on the sensor electrodes 315 at row 1 and row 6 as described above, the input device can determine the individual charges stored on these electrodes 315.

When a drive select line 310 is active, all the sensor electrodes 315 in the corresponding row are connected to respective drive lines 335. In one embodiment, the timing of the sense select lines 305 and the drive select lines 310 is synchronized so that the sense select lines 305 and drive select lines 310 corresponding to the same row of electrodes 315 are not active at the same time. Stated differently, in one embodiment, no electrode 315 is simultaneously connected to both a sense line 330 and a drive line 335. The specific timings used to control the switches 320, 325 and perform capacitive sensing using the sensor electrodes 315 is described in detail below.

In one embodiment, the drive lines 335 are coupled to individual drivers that can drive different voltages. For example, the sensor electrodes 315 in the first column can be driven to a HIGH voltage by drive line 335A while at the same time sensor electrodes 315 in the second column can be driven to a LOW voltage by drive line 335B. However, in another embodiment, several of the drive lines 335 may be selectively connected to the same driver. For example, instead of each drive line 335 being coupled to an individual driver, several of the drive lines may be coupled to a multiplexer which selectively connects several of the drive lines 335 (up to all of them) to the same voltage source. For example, the multiplexer may connect all the drive lines 335 to a HIGH voltage source (e.g., a maximum positive voltage), a LOW voltage source (e.g., a minimum negative voltage), or a reference voltage source ($V_{REF}$) (e.g., ground). Thus, when the multiplexer connects the drive lines 335 to the HIGH voltage source, the drive lines 335 drive whichever sensor electrodes 315 are currently connected to the drive lines 335 via the switches 325 to the HIGH voltage. Coupling the drive lines 335 to individual drivers may conserve power (because all the drive lines 335 are not driven to the same voltage) but connecting the electrodes to the same voltage source may save space and reduce cost.

Figure 4:
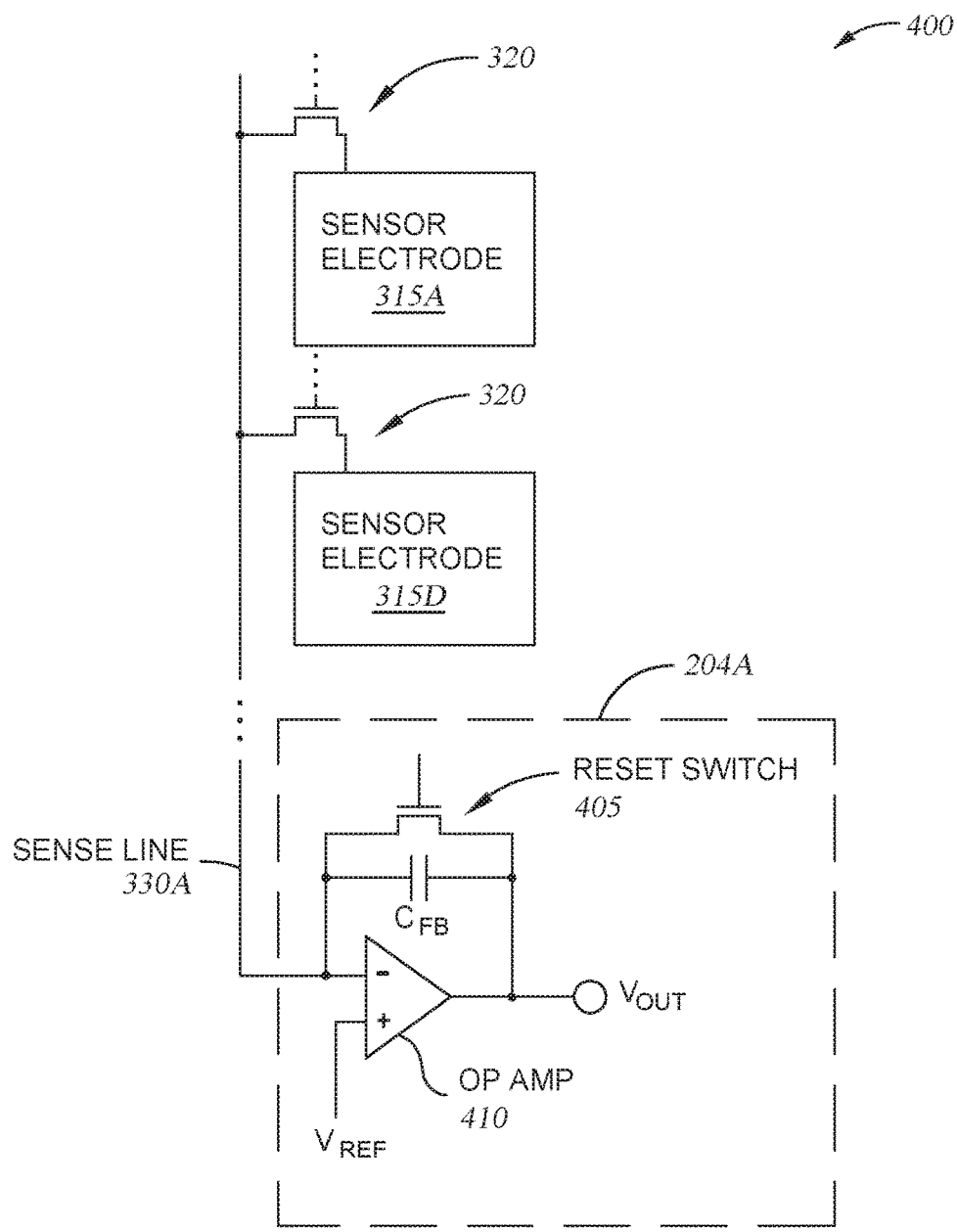
FIG. 4 illustrates a sensor module for detecting an input object in accordance with an embodiment of the invention.

FIG. 4 illustrates a sensor module 204A for detecting an input object in accordance with an embodiment of the invention. The same arrangement shown here may be reproduced for each of the sensor modules 204 in the sensor layout 300. The sensor module 204A includes an operational amplifier (op amp) 410, feedback capacitor ($C_{FB}$), and a reset switch 405 that is activated using the reset switch signal. If using a CDM technique, the sensor module 204A may measure charge on the sensor electrodes 315A and 315D simultaneously according to the CDM technique. When doing so, the reset switch 405 is deactivated (i.e., open) to prevent the input and output of the op amp 410 from being short circuited. In operation, the charge on the sensor electrodes 315A and 315D is transferred to the $C_{FB}$ which can be measured and processed using, for example, a determination module coupled to the output of the sensor module 204A. For example, the sensor module 204A may include an analog to digital converter which transmits a digital value corresponding to the measured charge to the determination module. Using backend calculations, the determination module can determine a change in capacitance for each of the sensor electrodes 315. Either the processing system 110 in FIG. 1 or a host processor can use the change in capacitance to determine a location of an input object or a fingerprint.

In one embodiment, the amount of charge on the sensor electrodes 315A and 315B varies depending on the capacitive coupling between the sensor electrodes 315A and 315B and an input object (e.g., a finger). For example, during a first time period, the sensor electrodes 315A and 315B are charged to a charging voltage. The amount of charge accumulated on the sensor electrodes 315A and 315B during the first time period depends on the capacitive coupling between the finger and these electrodes. During a second time period, the sensor module 204A measures the amount of charge that was accumulated on the sensor electrodes 315A and 315B during the first time period—i.e., the sum of charges on sensor electrodes 315A and 315B. Using this information, the fingerprint sensor can determine the capacitive coupling between the electrodes 315A and 315B and the finger which can indicate, for example, if a ridge or a valley of the finger is disposed over the electrodes 315A and 315B.

However, the capacitance between the electrodes 315A and 315B and the input object (finger) is not the only capacitance in the fingerprint sensor. There is also capacitive coupling between the sensor electrodes 315A and 315B and neighboring electrodes (not shown in FIG. 4). In fact, this capacitive coupling may be orders of magnitude larger than the difference of the capacitive coupling between a ridge in the finger to the electrodes 315A and 315B and the capacitive coupling between a valley in the finger to the electrodes 315A and 315B. Moreover, capacitive coupling from the sense line 330A and the drive lines 335 (and other neighboring sense and drive lines) to the sensor electrodes 315A and 315B may also affect how much charge is accumulated on the sensor electrodes 315A and 315B during the first time period. These capacitive couplings are collectively referred to herein as parasitic capacitances which make detecting the capacitive coupling between the input object and the sensor electrodes 315A and 315B more difficult to measure.

As used herein, a neighboring sensor electrode is a sensor electrode whose capacitive coupling to the electrode to be sensed interferes with the ability of a sensor module to measure a desired capacitance between the selected electrode and the input object. For example, when used as a fingerprint sensor, a neighboring sensor electrode may be a sensor electrode whose capacitive coupling to the selected electrode is at least on the same order of magnitude as the difference of the capacitive coupling between a ridge in the finger to the selected electrode and the capacitive coupling between a valley in the finger to the selected electrode. Moreover, an adjacent sensor electrode is an electrode that is directly next to the sensed electrode in the matrix, either at an angle or along a row or column. For example, referring to FIG. 3, the sensor electrode 315C can be a neighboring electrode to sensor electrode 315A even though electrode 315C is not directly adjacent to sensor electrode 315A.

Embodiments described herein use common mode cancellation to remove or mitigate the effects of the parasitic capacitance between the sensor electrodes 315A and 315B and their neighbors—i.e., the sensor electrodes to which the electrodes 315A and 315B are capacitively coupled. To do so, the fingerprint sensor ensures there is no voltage difference between the sensor electrodes 315A and 315B and their neighboring electrodes. If the voltage difference is zero, the charge accumulated on the sensor electrodes 315A and 315B is affected only by the capacitance coupling to the input object.

Figure 5:
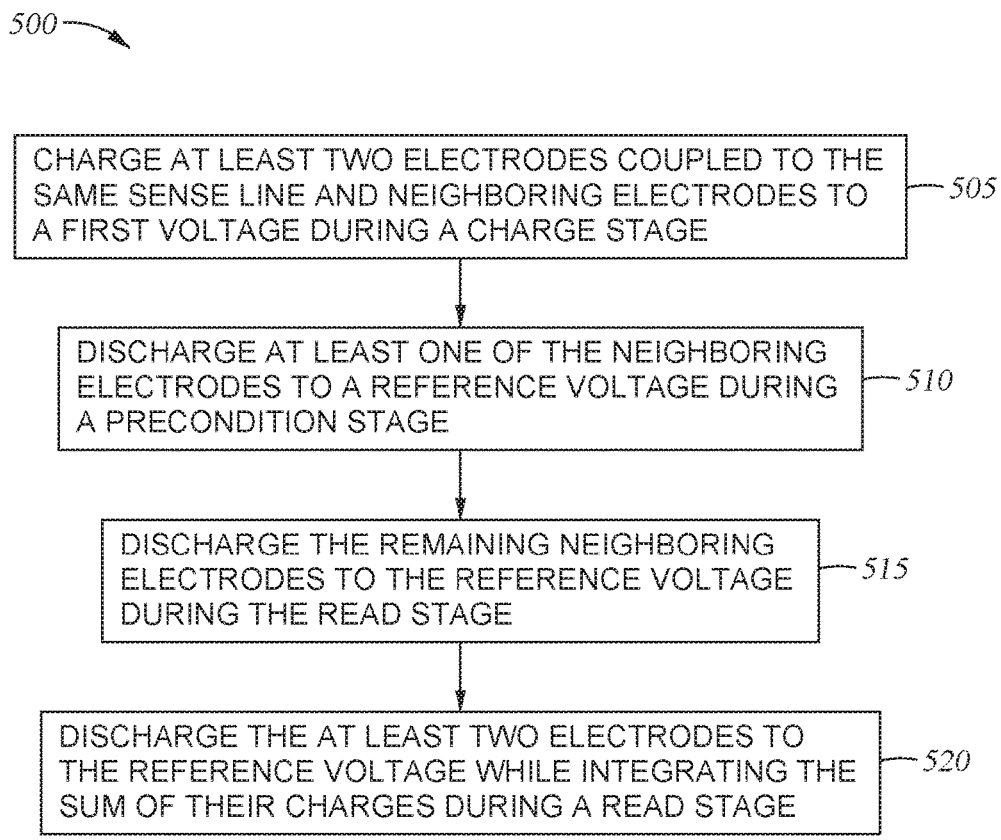
FIG. 5 is a flowchart for controlling neighboring electrodes when performing capacitive sensing in accordance with an embodiment of the invention.
Figure 6A:
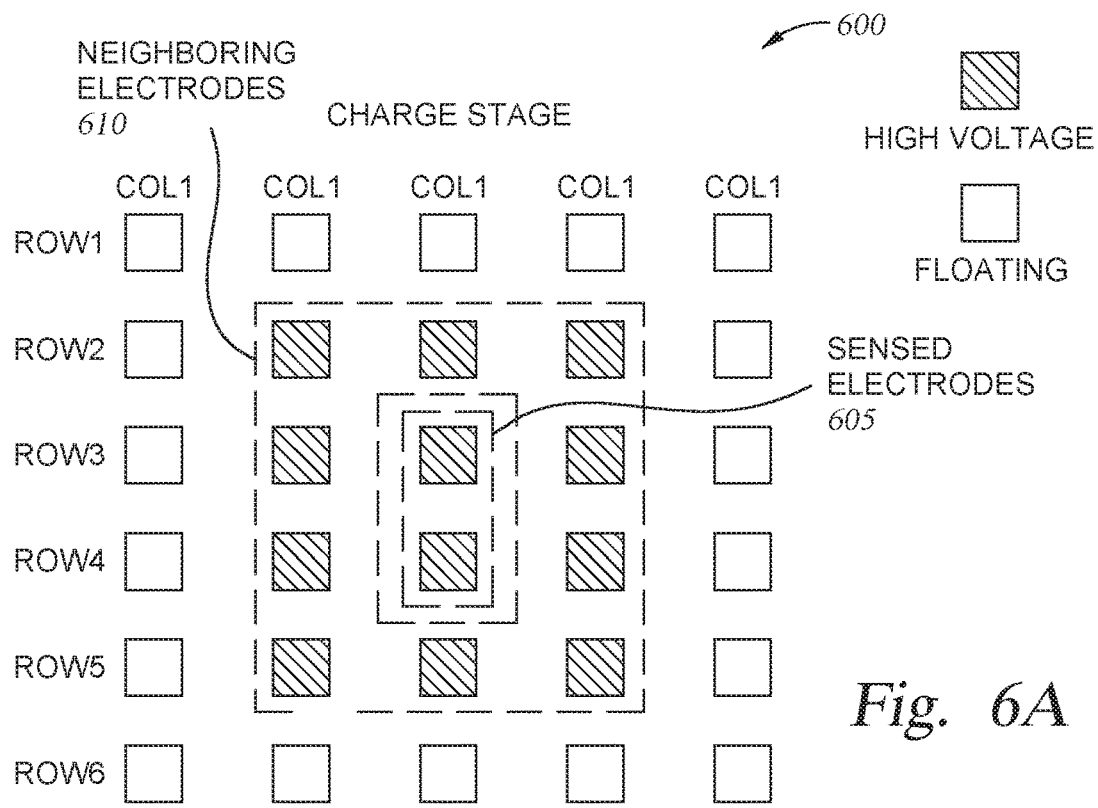
FIGS. 6A-6C illustrate sensing patterns for operating sensor electrodes in accordance with an embodiment of the invention.
Figure 6B:
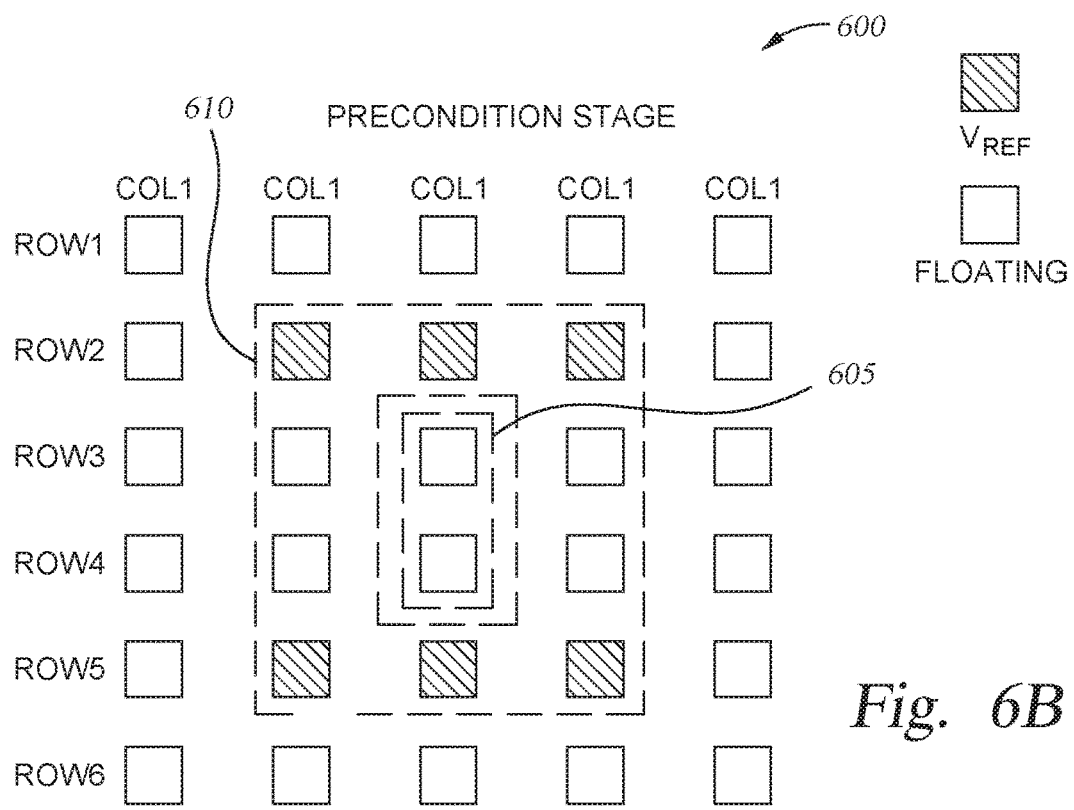
Figure 6C:
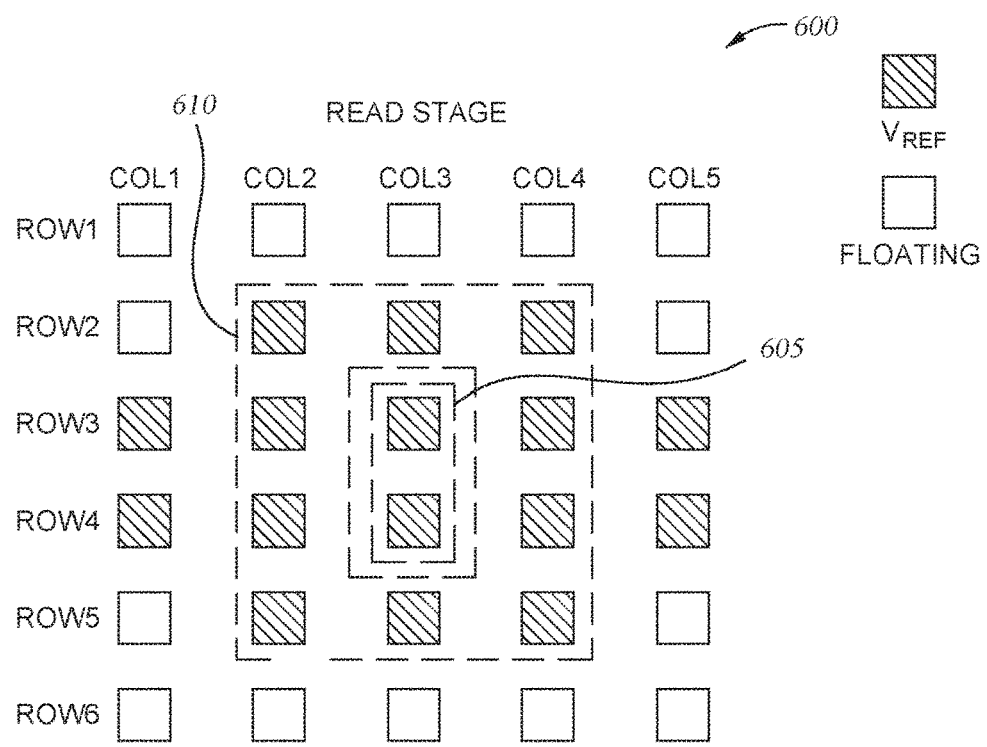

FIG. 5 is a flowchart of a method 500 for controlling neighboring electrodes when performing capacitive sensing in accordance with an embodiment of the invention. At block 505, the controller in the processing system charges at least two electrodes connected to the same sense line and at least one neighboring electrode to a first voltage during a charge stage. For clarity, the method 500 is discussed in tandem with FIGS. 6A-6C which illustrate sensing patterns for operating sensor electrodes in accordance with an embodiment of the invention. FIGS. 6A-6C illustrates a matrix sensor 600 that includes sensor electrodes (illustrated as individual squares) arranged in six rows and five columns. Although not shown, it is assumed the sensor electrodes are connected to sense and drive lines and select lines as shown in FIG. 3. For example, all the sensor electrodes in the same row are coupled to the same sense and drive select lines while all the sensor electrodes in the same column are selectively coupled to the same sense and drive lines.

FIGS. 6A-6C illustrate one example of performing the method 500 in order to measure the charge (or change in charge) on the two electrodes labeled sensed electrodes 605. Specifically, FIG. 6A illustrates performing the charge stage as described in block 505 of method 500. As shown, the sensed electrodes 605 along with neighboring electrodes 610 that are directly adjacent to the sensed electrodes 605 are driven to the charging voltage (e.g., HIGH voltage). That is, in this embodiment, the neighboring electrodes 610 include the electrodes that surround the sensed electrodes 605.

The hashing in the sensed electrodes 605 and the neighboring electrodes 610 illustrates that these electrodes are driven to a high voltage during the charge stage. That is, these sensor electrodes are connected to the drive lines 335 in FIG. 3 which connect the electrodes to one or more high voltage sources. Because the voltage difference between the neighboring electrodes 610 and the sensed electrodes 605 during the charge stage remains zero, the parasitic capacitive coupling between these electrodes does not affect the amount of charge stored in the sensed electrodes 605. However, if an input object is capacitively coupled to the sensed electrodes 605, then this capacitance does affect the amount of charge stored in the sensed electrodes 605 during the charge stage, and thus, affect the amount of charge detected during the read stage discussed below.

While the sensed electrodes 605 and the neighboring electrodes 610 are driven to the high voltage, the surrounding electrodes in row 1 and 6 and columns 1 and 5 are electrically floating. In one embodiment, the corresponding switches 320 and 325 for each of these sensor electrodes are deactivated (i.e., open) such that the sensor electrodes are not connected to either the sense lines or the drive lines. However, in other embodiments, the electrodes in row 1 and 6 and columns 1 and 5 can also be driven to the high voltage during the charge stage which prevents any capacitive coupling between these electrodes and the sensed electrodes 605 from affecting the amount of charge stored on the sensed electrode 605 during this stage. However, driving these electrodes requires power. Thus, the system designer may balance between mitigating the parasitic capacitance between the sensed electrodes 605 and the neighboring electrodes and the power consumption of the matrix sensor 600. In FIG. 6A, only the neighboring electrodes 610 that are directly adjacent to the sensed electrodes 605 are driven to high voltage, but in other examples all the sensor electrodes can be driven to the high voltage.

Although FIG. 6A illustrates driving the sensed electrodes 605 and the neighboring electrodes 610 to a high voltage, in other cycles of a CDM technique (where method 500 is repeated), these electrodes may be driven to a negative voltage. In one example, the high and low voltages may be +/−20V relative to a reference voltage (e.g., virtual ground).

Returning to method 500, at block 510, the controller discharges at least one of the neighboring electrodes to a reference voltage during a precondition stage. Moreover, the sensed electrodes are electrically floating during the precondition stage. In one embodiment, the precondition stage is used to ensure that the sensed electrodes are disconnected from the drive lines (which drives a high or low voltage onto the sensed electrodes) before the sensed electrodes are connected to the sense lines so that the AFE in the sensor module can measure the charge on the sensed electrodes. Put differently, the precondition stage can provide a length of time to sequentially activate the switches 320 and 325 in FIG. 3 coupled to the sensed electrodes so that these electrodes are not connected to the sense and drive lines simultaneously.

FIG. 6B illustrates driving the matrix sensor 600 during the precondition stage. As shown, the neighboring electrodes 605 in rows 2 and 5 are driven to the reference voltage $V_{REF}$ while the neighboring electrodes 610 in rows 3 and 4 along with the sensed electrodes 605 are electrically floating. In one embodiment, the switches coupling the sensor electrodes in rows 3 and 4 to the drive lines are deactivated such that these rows are no longer connected to the drive lines.

Once rows 3 and 4 are disconnected from the drives lines, the processing system can change the voltage on the drives lines corresponding to columns 2-4 to the reference voltage which causes the voltage on the neighboring electrodes in rows 2 and 5 to decrease to $V_{REF}$. However, because rows 3 and 4 are disconnected from the drive lines (i.e., are electrically floating), the charge stored in the neighboring electrodes 610 and the sensed electrodes in rows 3 and 4 does not change.

In another embodiment, instead of driving the voltage on the neighboring electrodes 610 in rows 2 and 5 to $V_{REF}$ using the drive lines, the processing system may disconnect these electrodes from the drive lines and instead connect these electrodes to the sense lines which may be constantly driven to $V_{REF}$. By making this switch, the neighboring electrodes 610 in rows 2 and 5 are driven to $V_{REF}$ without having to change the voltage on the drive lines for columns 2-4.

In a further embodiment, it is not necessary that the voltage on the neighboring electrodes 610 in rows 2 and 5 be driven to $V_{REF}$ during the precondition stage. Instead, these electrodes can be driven to $V_{REF}$ during the subsequent read stage. For example, during the precondition stage the neighboring electrodes 610 in rows 2 and 5 can be electrically floated by disconnecting these electrodes from the drive lines in columns 2-4 (like what is done with the sensor electrodes in rows 3 and 4).

Returning to the method 500, at block 515, the controller discharges the remaining electrodes to the reference voltage during the read stage. In one embodiment, the processing system drives any of the neighboring electrodes that were driven to the high voltage during the charging stage to the reference voltage if the electrodes were not previously driven to the reference voltage. FIG. 6C illustrates driving the matrix sensor 600 during the read stage. As shown, the neighboring electrodes 610 in rows 3 and 4 that were not driven to $V_{REF}$ during the precondition stage shown in FIG. 6B are connected to the sense lines which drive their voltages to $V_{REF}$.

Returning to method 500, at block 520, the controller discharges the at least two electrodes (i.e., the sensed electrodes) to the reference voltage while integrating the sum of their charges during a read stage. That is, the sensed electrodes, which are electrically floating during the precondition stage, are connected to the sense lines during the read stage. As shown in FIG. 4, the positive terminal of the op amp 410 is coupled to $V_{REF}$ which drives the sense line 330A (and the sensor electrodes 315A and 315B when the switches 320 are active) to $V_{REF}$. Thus, when the sensor electrodes 315A and 315B are connected to the sense line 330A, the sensor module 204A begins to integrate the charge stored in these sensor electrodes 315A and 315B during the charge stage.

FIG. 6C illustrates driving the matrix sensor 600 during the read stage. In this embodiment, the sense select lines for rows 3 and 4 are activated thereby connecting the electrodes in these rows to their respective sense lines. Assuming the sense lines are driven to $V_{REF}$ by the sensor module, then during the read stage the sensor electrodes in rows 3 and 4 are also driven to $V_{REF}$.

The neighboring electrodes in rows 2 and 5 may remain connected to the drive lines during the read stage which maintains these electrodes at the reference voltage. Alternatively, the neighboring electrodes in rows 2 and 5 can also be connected to the sense lines during the read stage but it may be preferred to maintain connection to drive lines on column 3 (the sense electrode column) since disconnecting the rows from the drive line and connecting to sense lines can produce residual charge transfer or noise which may harm capacitive sensing. Further, the electrodes at row 3, columns 1 and 5 as well as the electrodes at row 4, columns 1 and 5 are at $V_{REF}$ if the corresponding sense lines are connected to $V_{REF}$. However, these electrodes would be floating if their corresponding sense lines are floating. Because these sensor electrodes are driven to $V_{REF}$ during the precondition stage shown in FIG. 6B which depletes their charge, coupling the sensor electrodes in rows 2 and 5 to the same sense line as the sensed electrodes 605 does not affect the charge measured by the sensor module during the read stage. Stated differently, coupling the neighboring electrodes directly above and below the sensed electrodes 605 to the sense line shared with the sensed electrodes 605 does not affect the charge measured by the sensor module so long as the neighboring electrodes were driven to the reference voltage previously.

In one embodiment, blocks 515 and 520 are performed in parallel. In another embodiment, the functions described in blocks 515 and 520 may be performed, at least partially, during non-overlapping time periods but end at the same time.

During the method 500, the neighboring electrodes 610 and the sensed electrodes 605 are driven to a high voltage (which can be a negative or a positive voltage) and then driven to $V_{REF}$. Because the voltage difference between the neighboring electrodes 610 and the sensed electrodes 605 remains constant (zero in this example), the effect of the parasitic capacitance between the neighboring electrodes 610 and the sensed electrodes 605 when charging the sensed electrodes during the charge stage and when depleting the charge during the read stage is reduced. Thus, the capacitive sensing measurements acquired during the read stage using the sensed electrodes 605 may more accurately represent the capacitance between the sensed electrodes 605 and the input object, e.g., a user's finger.

The processing system can repeat the method 500 on the matrix sensor 600 to perform CDM. Although FIGS. 6A-6C illustrate measure capacitance on two of the electrode simultaneously, in other embodiments, the processing system may use four, eight, or more sensed electrodes which are measured simultaneously during the read stage. Furthermore, the processing system may perform the method 500 on sensed electrodes in different columns. For example, while performing the charge, precondition, and read stage on the sensed electrodes 605 shown in the matrix sensor 600, the processing system may also perform the same actions on sensed electrodes and neighboring electrodes in other locations in the matrix sensor 600. For example, the processing system may charge, precondition, and read sensor electrodes in column 10 at the same time the sense electrodes 605 in column 3 are charged, preconditioned, and read. Further, the processing system may drive different polarities onto the different sensed electrodes in the columns. For example, during the charge stage, the processing system may drive the sensed electrodes 605 in column 3 to a positive high voltage while driving the sensed electrodes in column 10 to a negative high voltage. In this manner, the processing system can charge, precondition, and read on multiple electrodes in each column in the matrix sensor 600 in parallel. However, this assumes the processing system has a respective sensor module coupled to each sense line. If multiple sense lines are multiplexed to the same sensor module—i.e., there are fewer sensor modules than sense lines—the processing system measures charge from only the sensor electrodes that are currently connected to the sensor modules.

In one embodiment, it may be desired to drive the sensed electrodes 605 to different polarity voltages during multiple iterations of method 500 if the AFEs are differential. For example, method 500 may be repeated for the sensed electrodes 605 except that instead of driving the sensed electrodes 605 and neighboring electrodes 610 to a positive voltage during the charge stage, these electrodes are driven to a negative voltage.

One advantage of operating the sensor layout 300 in FIG. 3 using the method 500 shown in FIG. 5 is that the drive and sense lines are separate which means the high voltages used during the charging stage are separated from the readout function performed by the sense lines and the sensor modules. For example, the voltages on the drive lines may range from +/−50 V while the voltages on the sense line may never exceed +/−1 V. As a result, the AFE in the sensor module may operate in a voltage range less than +/−1 V which means the design of the AFE can be simpler, more cost effective, and conserve power.

FIG. 7 is a timing diagram 700 corresponding to the sensor layout shown in FIG. 6A in accordance with an embodiment of the invention. The x-axis of the diagram 700 represents time and is subdivided into the charge, precondition, and read stages. The y-axis lists the states of the drive select lines, drive lines, and sense select lines for various rows and columns in the matrix sensor 600 in FIG. 6A. During the charge stage, the drive select lines for rows 3 and 4 are ON which connects the sensor electrodes in rows 3 and 4 (which includes the sensed electrodes) to the drives lines. The drive select lines for rows 2 and 5 are also ON during the charge stage since these rows include electrodes that are directly adjacent to the sensed electrodes in rows 3 and 4.

The drive lines for columns 2-4 which includes the directly adjacent neighboring electrodes and the sensed electrode are driven to the HIGH voltage during the charge stage. The sense select lines for rows 3 and 4 are maintained in the OFF state so that the electrodes in these rows are not simultaneously connected to the drive lines and the sense lines. Upon the completion of the charge stage, the voltages on the sensed electrodes and the neighboring electrodes are in the state shown by FIG. 6A.

During the precondition stage, the drive select line for rows 3 and 4 are turned OFF thereby disconnecting the sensor electrodes in these rows from the drive lines (which are still at the HIGH voltage at the beginning of the precondition stage). Because the sense select lines for rows 3 and 4 are also OFF during the precondition stage, the electrodes in these rows are electrically floating like as in shown in FIG. 6B. Approximately half way through the precondition stage, the drive lines for columns 2-4 switch from driving the HIGH voltage to driving the reference voltage $V_{REF}$. Because the drive select lines for rows 2 and 5 are still ON, the electrodes in rows 2 and 5 and columns 2-4 are driven to $V_{REF}$ as shown in FIG. 6B. Although shown as switching half way through the precondition stage, the drive lines can switch to $V_{REF}$ as soon as the switches (e.g., TFTs) to the sensing electrodes are completely turned off.

During the read stage, the sense select lines for rows 3 and 4 are ON which connects each electrode in these rows to a sense line. Doing so drives the sensor electrodes in rows 3 and 4 to $V_{REF}$. In parallel, an AFE in the sensor module coupled to the sensed electrodes can measure the charge stored in the sensed electrode during the charge stage, which can then be processed to determine a capacitance measurement for each of the individual sensed electrodes.

Figure 8A:
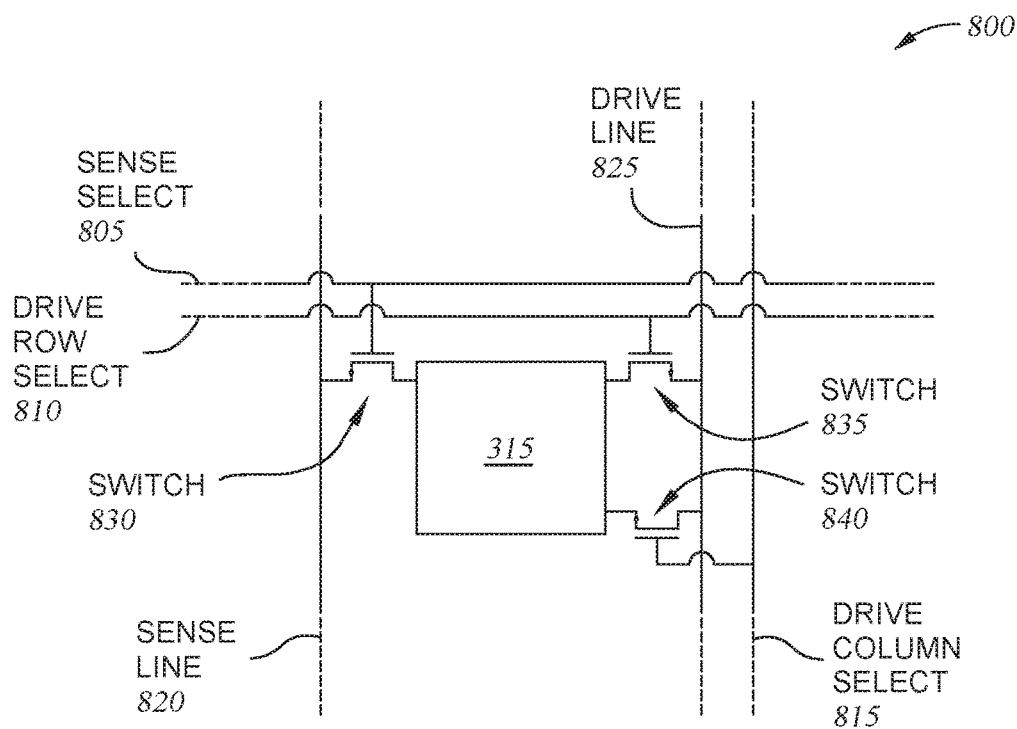
FIGS. 8A and 8B illustrates a sensor layout for detecting an input object in accordance with an embodiment of the invention.
Figure 8B:
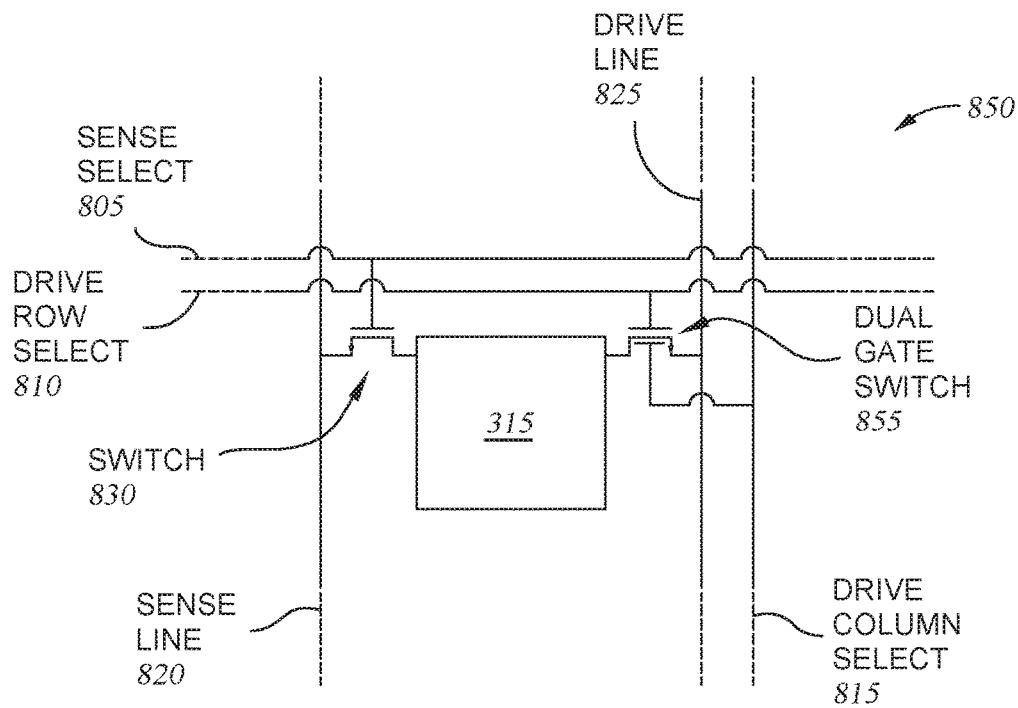

FIGS. 8A and 8B illustrates a sensor layout 800 for detecting an input object in accordance with an embodiment of the invention. The sensor layout 800 includes a sensor electrode 315 that is selectively connected to a sense line 820 via a switch 830 and to a drive line 825 by either a switch 835 or a switch 840. That is, unlike in FIG. 3 where the sensor electrodes 315 are connected to the drive line 335 by a single switch 325, in the sensor layout 800 each sensor electrode 315 is connected to the drive line 825 by two switches. The switch 835 is controlled by a drive row select line 810 (which is arranged in a similar position as the drive select line 310 in FIG. 3), while switch 840 is controlled by a drive column select line 815 that extends parallel to the drive line 825.

Adding the switch 840 and the drive column select line 815 permits the processing system to connect a neighboring electrode in the same row as a sensed electrode to the drive line when the sensed electrode is floated. Using FIG. 6B as an example, during the precondition stage, the neighboring electrodes 610 in the same rows as the sensed electrodes 605 (i.e., rows 3 and 4) are electrically floated since both the sense select line 305 and the drive select line 310 in FIG. 3 are OFF. However, if the sensor layout 800 in FIG. 8A was instead used, during the precondition stage the neighboring electrodes 610 in the same rows as the sensed electrodes 605 can be driven by the drive lines to $V_{REF}$ the same as the neighboring electrode 610 in rows 2 and 5. That is, during the precondition stage, the processing system activates the drive column select line 815 which turns ON the switch 840 and connects the sensor electrode 315 to the drive line 825 which drives the sensor electrode 315 to $V_{REF}$. Thus, if sensor layout 800 was used to form the matrix sensor 600 shown in FIG. 6B, the neighboring electrodes 610 in rows 3 and 4 (i.e., the electrodes to the left and right of the sensed electrodes 605) are driven to $V_{REF}$ like the other neighboring electrodes 610 rather than being electrically floating as shown.

FIG. 8B illustrates a sensor layout 850 similar to the sensor layout 800 except that the two switches 835 and 840 are replaced by a dual gate switch 855 which is activated either by drive row select line 810 or by drive column select line 815. That is, the drive row select line 810 and the drive column select line 815 can independently activate the dual gate switch 855 and connect the sensor electrode 315 to the drive line 825. Thus, the sensor layout 850 can perform the function recited above where if the sensor electrode 315 is disposed on the same row as a sensed electrode, the electrode 315 can be driven to $V_{REF}$ during the precondition stage.

Noise Mitigation when Performing CDM

As described above, when performing CDM, multiple sensor electrodes are coupled to the same sensor module (e.g., the same AFE) and are charged to different voltages according to a predefined code. As such, the sensor module generates a measurement that represents the sum of the charges (e.g., a combined charge) on the sensor electrodes rather than an individual charge on a single sensor electrode. By repeatedly sensing multiple sensor electrodes in parallel with different sets of voltages according to the code, the input device can determine a change of capacitance for each individual sensor electrode. In one embodiment, the code used to perform CDM includes an N number of invertible combinations of the sensor electrodes (which can be expressed in a two-dimensional matrix) to determine the individual charge stored on an N number of the sensor electrodes. By using an N number of combinations (where N is equal to or greater than the number of sensor electrodes to be sensed), the input device can determine the individual charge stored on each of the sensor electrodes. Backend calculations can be performed to determine the individual charge (or change in charge) corresponding to each sensor electrode. Although CDM is specifically described, the embodiments herein can be used with any sensing technique that uses predefined codes to drive the sensor electrodes. In one embodiment, the codes can be any, invertible sequence of voltages that are driven on the sensor electrodes.

When performing CDM, the transistors that connect the sensor electrodes to the sensing and drive lines (and to the sensor module) can inject charge. For example, field effect transistors (e.g., a PFET or NFET) have a capacitance between the gate and the source and drain. Thus, driving a signal on the gate can inject charge (e.g., noise) onto both the source and drain which may be coupled to the sensor electrodes. In another example, when a transistor is deactivated (e.g., the gate is turned off), the charge in the conductive channel is forced out of the intrinsic region into the source and drain connections which can also inject charge and noise into the sensor module.

To mitigate charge injection from switching the transistors, in one embodiment, each column in the sensor array includes an offset sensor electrode. For example, instead of coupling all of the sensor electrodes in the same column to the sensor module when capturing a capacitive sensing measurement, at least one of the sensor electrodes in the column is selected as an offset sensor electrode. The offset electrodes are not sensed but rather their sense select switches are driven to compensate for the charge injection described above. During a subsequent CDM cycle or measurement, the sensor electrodes designated as the offset sensor electrodes are switched such that each sensor electrode in the column is sensed at least once. For example, each column of a sensor electrodes may be sensed eight times where the sensor electrodes designated as offset sensor electrodes changes.

In addition, the input device may perform double correlated sampling which can mitigate the noise injected by the reset switch (or transistor) in the sensor module. In one embodiment, the reset switch is switched when the offset sensor electrodes are coupled to the sensor module. The senor module then samples the total charge on the offset sensor electrodes. The sense select lines are then controlled so that the offset sensor electrodes are disconnected from the sensor module while the remaining sensor electrodes in the column are connected to the sensor module and sampled. The input device can use double correlated sampling to identify and remove the charge injected from the reset switch from the capacitive sensing measurement.

Figure 9:
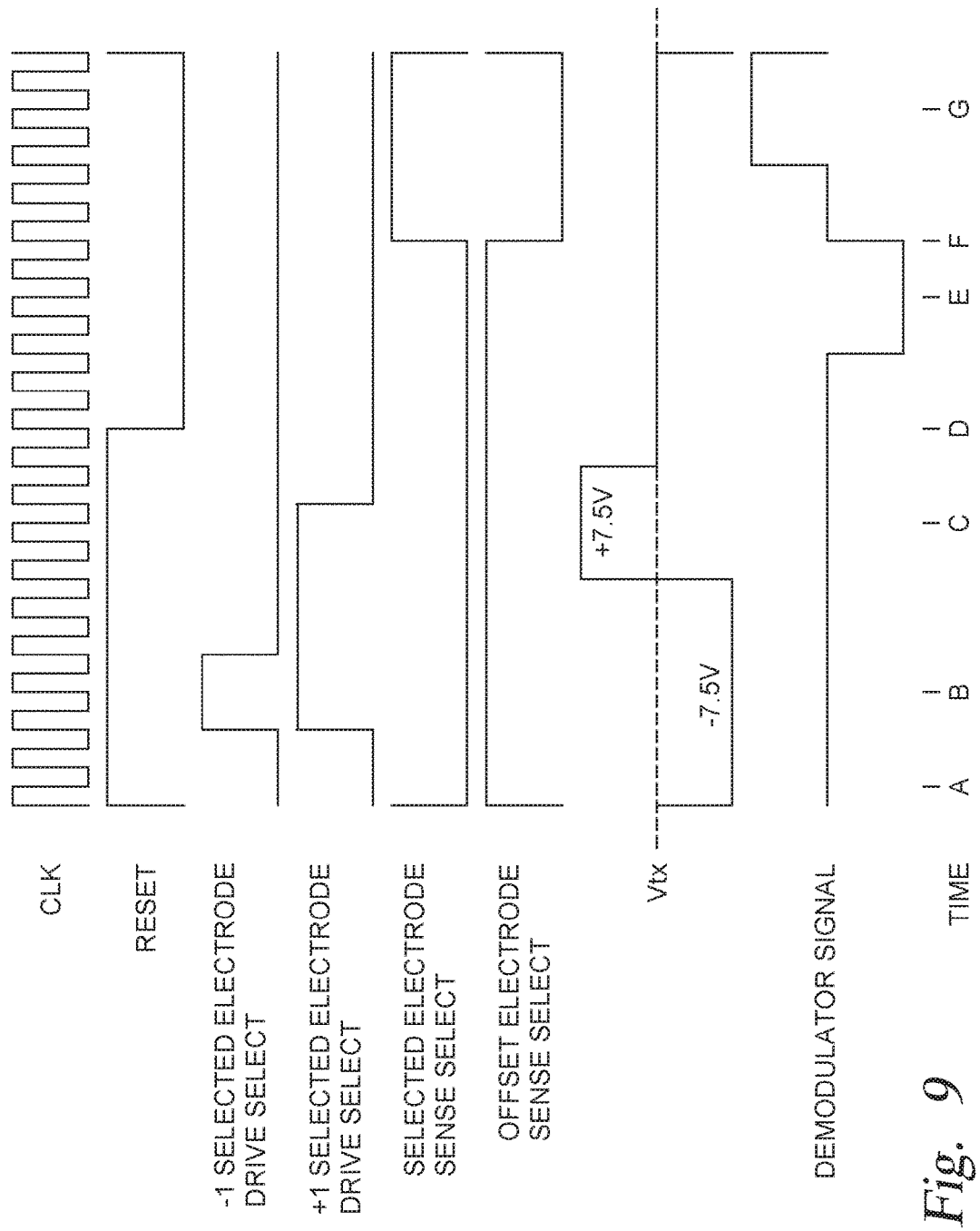
FIG. 9 illustrates a timing chart for using offset sensor electrodes when performing capacitive sensing in accordance with an embodiment of the invention.

FIG. 9 illustrates a timing chart for using offset sensor electrodes when performing capacitive sensing in accordance with an embodiment of the invention. For clarity, FIG. 9 is discussed using the sensor layout 300 shown in FIG. 3. That is, each sensor electrode 315 is selectively coupled to either a sense line 330 or a drive line 335 to perform capacitive sensing. When performing CDM, multiple sensor electrodes 315 in a column are connected to the same sensor module 204 which measures a total charge on the sensor electrodes 315. Moreover, the functions described in FIG. 9 may be performed by the controller circuit 210 in the processing system 110. For example, the controller circuit 210 may include logic for controlling the gate lines, driving voltages onto the sensor electrodes, controlling the select lines, controlling the reset switch in the sensor module, etc.

In one embodiment, at least one of the sensor electrodes 315 in the column is designated as an offset sensor electrode while the remaining sensor electrodes 315 in the column are designated as selected sensor electrodes. The offset sensor electrodes are used to compensate for the charge injection generated when switching the transistors in the layout 300—e.g., switches 320, 325, and the reset switch in the sensor modules 204. In another embodiment, the input device may include dedicated offset switches that are located outside of the layout 300. For example, the dedicated offset switches may compensate for the charge injection generated by the switches 320 and 325 in the sensor layout 300 but are not coupled to the sensor electrodes 315 that are used for capacitive sensing.

Figure 10A:
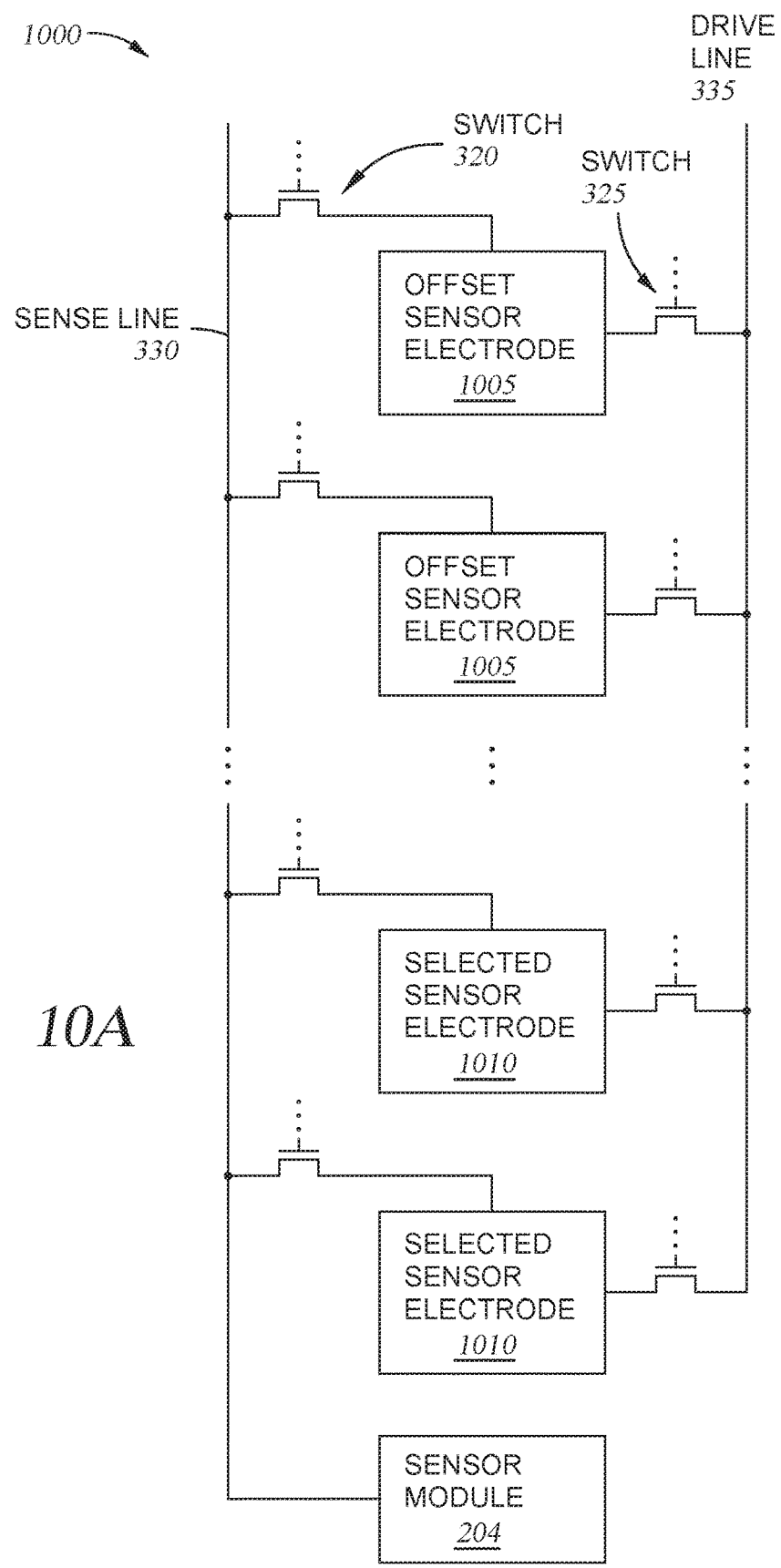
FIGS. 10A-10E illustrate operational states of a column of sensor electrodes during various time periods illustrated in FIG. 9 in accordance with embodiments of the invention.

FIGS. 10A-10E illustrate operational states of a column 1000 of sensor electrodes during various time periods illustrated in FIG. 9 in accordance with embodiments of the invention. Specifically, FIGS. 10A-10E correspond to one column 1000 of sensor electrodes 315 shown in the sensor layout 300 which illustrates the electrical connections of the offset and selected sensor electrodes during the time periods in FIG. 9. FIG. 10A illustrates a column 1000 of sensor electrodes 315 in the layout 300 where two of the sensor electrodes are designated as offset sensor electrodes and two of the sensor electrodes are designated as selected sensor electrodes during the CDM cycle illustrated in FIG. 9. Each of the sensor electrodes are connected to the switch 320 which selectively couples the sensor electrode to the sense line 330 and the sensor electrodes are connected to the switch 325 which selectively couples the sensor electrode to the drive line 335. For clarity, the sense select lines 305 and the drive select lines 310 are not shown.

At Time A in FIG. 9, the selected sensor electrodes are disconnected from both the drive line 335 and from the sense lines 330, and as a result, are electrically floating. The offset sensor electrodes in each column of the layout 300, however, are connected to their respective sense lines 330, and thus, are connected to one of the sensor modules 204. Although not shown in FIG. 9, the offset sensor electrodes remain disconnected from the drive line 335 through Times A-G.

Moreover, as shown by the RESET signal in FIG. 9, the reset switch in the sensor module 204 is closed which drives the sense line 330 to a reference voltage $V_{REF}$ (e.g., ground). Because the offset sensor electrodes are coupled to the sense line 330, these electrodes are also driven to the reference voltage $V_{REF}$.

Figures 10B, 10C:
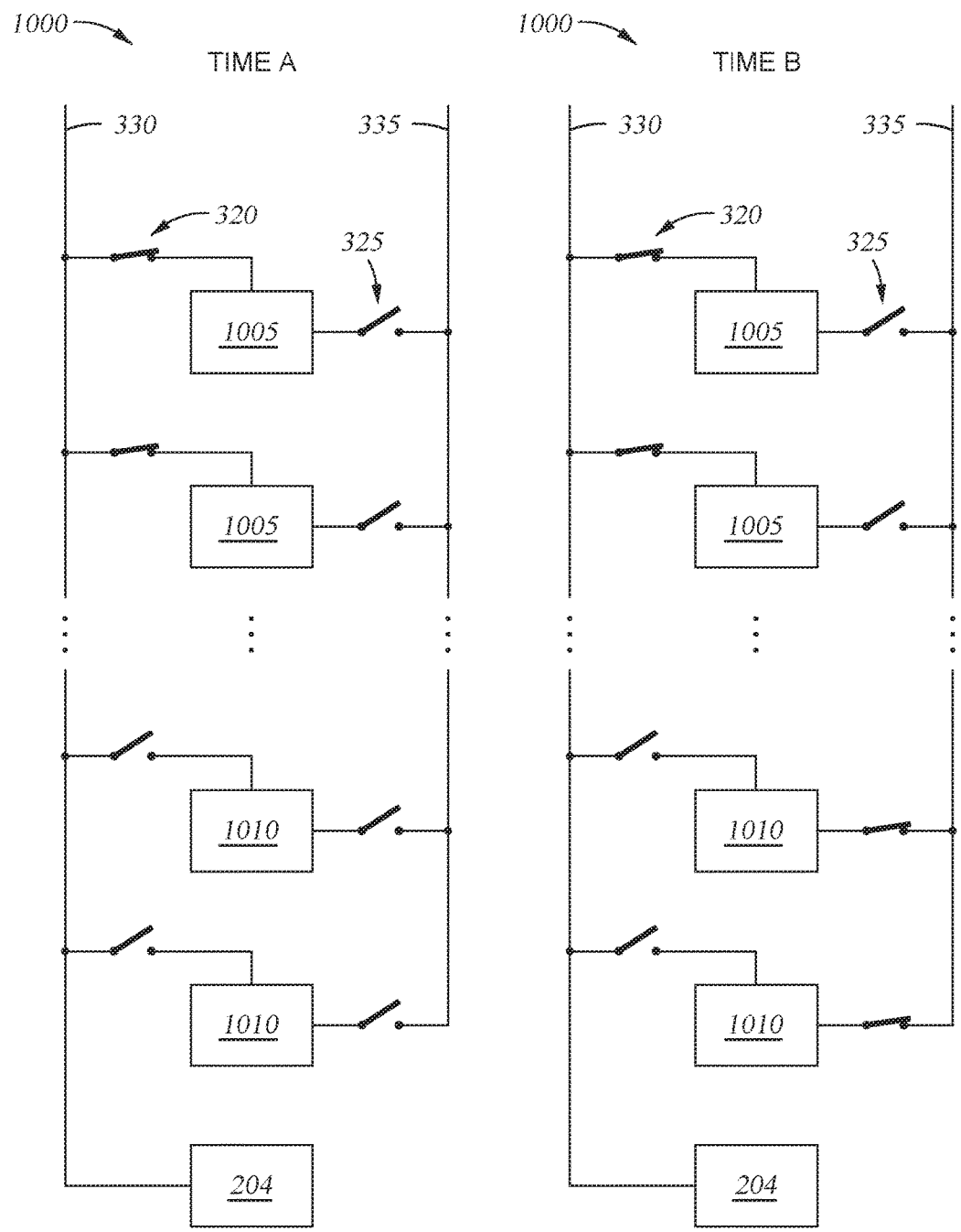

FIG. 10B illustrates the operational state of the column 1000 during Time A in FIG. 9. For the selected sensor electrodes 1010, the switches 320 and 325 are open which means these electrodes 1010 are disconnected from both the drive line 335 and the sense lines 330, and thus, are electrically floating. In contrast, the offset sensor electrodes 1010 are connected to the sense line 330 by the switches, and thus, are driven to the reference voltage $V_{REF}$ by the sensor module 204.

At Time B in FIG. 9, the input device controls the drive select lines 310 to couple the selected sensor electrodes to the drive lines 335. FIG. 9 illustrates a +1 selected electrode drive select signals and a −1 selected electrode drive select signal. A CDM code may include multiple cycles or iterations where during each cycle one or more of the selected sensor electrodes are driven to a positive voltage (+1) while one or more of the selected sensor electrodes are driven to a negative voltage (−1). During subsequent cycles or iterations, the voltages driven on the selected sense electrodes can switch where a sensor electrode that was driven to a negative voltage is now driven to a positive voltage and a sensor electrode that was driven to a positive voltage is now driven to a negative voltage. However, the voltages for the +1 and −1 electrodes do not need to be positive and negative relative to the reference voltage $V_{REF}$. For example, the electrodes corresponding to the +1 selected electrode drive select signals can a first positive voltage while the electrodes corresponding −1 selected electrode drive select signal are driven to a second, different positive voltage relative to $V_{REF}$. Alternatively, the +1 and −1 sensor electrodes could be driven to two different negative voltages relative to the reference voltage $V_{REF}$. That being said, using positive and negative voltages relative to $V_{REF}$ (which have equal magnitudes) can improve the signal measured by the sensor module 204.

The signal $V_{tx}$ represents the voltage driven on the drive line 335. In this embodiment, at Time B, the selected sensor electrodes are driven to −7.5V. However, this is exemplary and other voltages can be used.

FIG. 10C illustrates the operational state of the column 1000 during Time B in FIG. 9. As shown, the selected sensor electrodes 1010 are coupled to the drive line 335 while the offset sensor electrodes 1005 are coupled to the sense line 330. Thus, the selected sensor electrodes 1010 are driven to $V_{tx}$ (i.e., −7.5V as shown in FIG. 9).

At Time C in FIG. 9, the "−1" selected sensor electrodes are disconnected from the drive lines 335 while the "+1" selected sensor electrodes remain coupled to the drive lines 335. Moreover, the voltage $V_{tx}$ (driven on the drive lines 335 changes from a negative voltage to a positive voltage—e.g., +7.5 V. That is, the selected sensor electrodes that are designated to have positive voltages according to the CDM code remain coupled to the drive lines 335 so that their voltages are driven to +7.5V. In contrast, the selected sensor electrodes that should have negative voltages during the CDM cycle are disconnected from the drives lines 335, and thus, remain at −7.5 V.

While FIG. 9 illustrates driving all the selected sensor electrodes 1010 to the negative voltage before driving the "+1" selected sensor electrodes 1010 to the positive voltage, in one embodiment, the input device may drive, at Time B, only the "−1" selected sensor electrodes 1010 to the negative voltage, and at Time C, drive only the "+1" selected sensor electrodes 1010 to the positive voltage. However, driving all the selected sensor electrodes the same voltage at Time C as shown in FIG. 9 may save time.

Referring again to FIG. 10C, if one of the selected sensor electrodes 1010 is a "−1" sensor electrode and the other one electrode 1010 is a "+1 electrode, then at Time C, only one of the sensor electrodes 1010 is coupled to the drive line 335 while the other is disconnected from the drive line 335. Thus, one of the selected sensor electrodes 1010 has a positive voltage while the other selected sensor electrode 1010 has a negative voltage.

At Time D in FIG. 9, the reset switch in the sensor module 204 is opened. However, the transistor forming the reset switch may inject charge onto the sense line 330 which can affect the measurement generated by the sensor module 204. To compensate for this charge injection, the sensor module 204 performs a double correlated sampling: at least one sample is captured at Time E, while another sample is captured at Time G as shown by the demodulator signal. Any charge measured by the sensor module 204 at Time E is dependent on the charge injected when opening or deactivating the reset switch. In this manner, the input device can determine the charge injected by the reset switch.

Figure 10D:
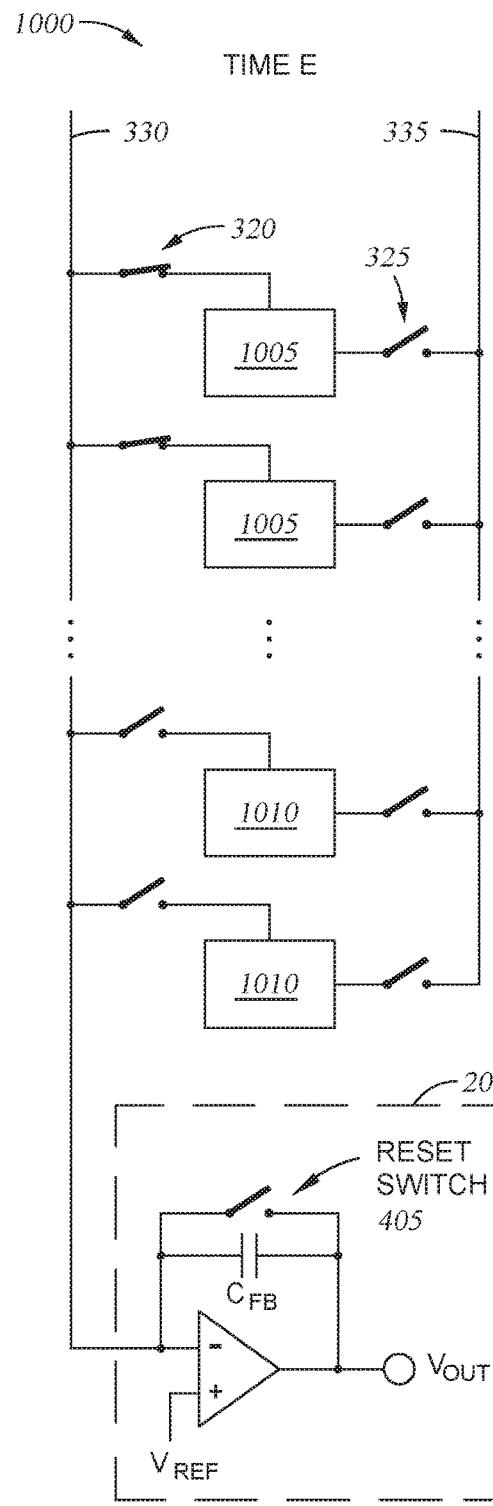
Figure 10E:
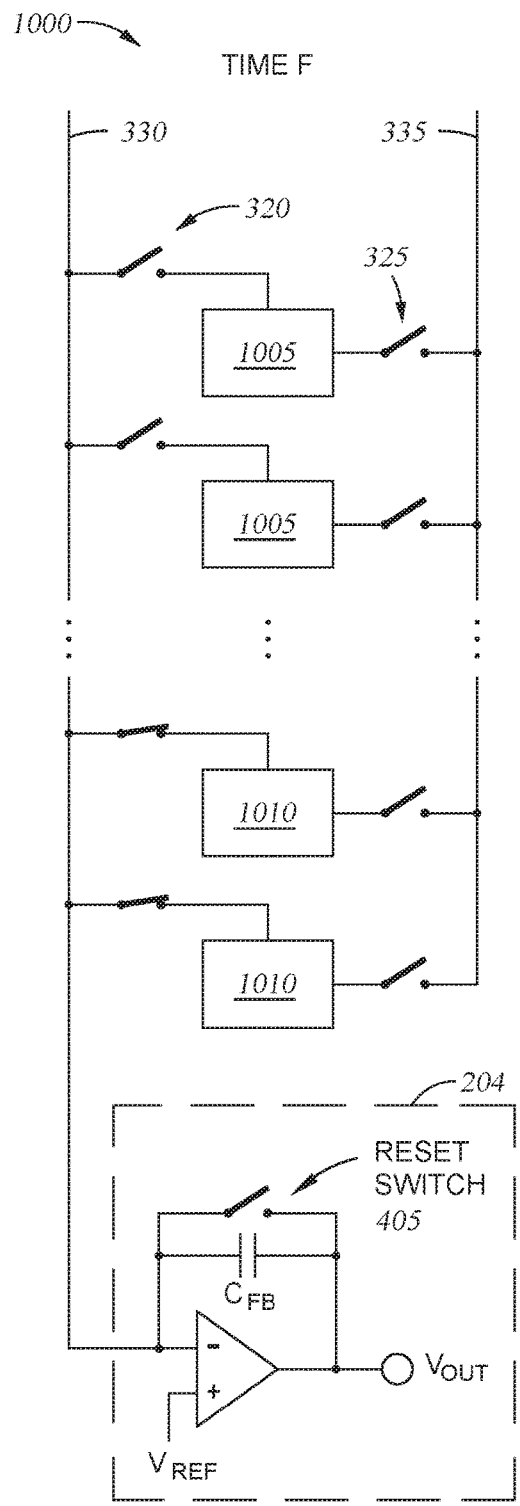

FIG. 10D illustrates the operational state of the column 1000 during Time E in FIG. 9. As shown, the selected sensor electrodes 1010 are electrically floating (but have been previously charged to the positive and negative voltages during Times B and C). The offset sensor electrodes 1005 remain coupled to the sense line 330, and thus, there is no net charge on the electrodes 1005 which is sampled during Time E by the sensor module 204. Because the offset sensor electrodes 1005 were previously driven to the reference voltage, the measurement obtained by the sensor module 204 may depend primarily on the charge injected from switching the reset switch 405 to the open state as shown in FIG. 10D. The negative effects associated with the charge injected by the reset switch 405 can be mitigated by the backend processing performed in the input device. In one embodiment, the input device uses a matched filter for removing the charge injected from the reset switch 405 from the capacitive sensing measurements.

At Time F, the input device uses the sense select lines 305 to couple the selected sensor electrodes to the sense line 330. In parallel, the input device disconnects the offset sensor electrodes from the sense line 330. Thus, for each column in the array, only the selected sensor electrodes are coupled to the sense line 330 while the offset sensor electrodes are not.

Figure WE illustrate the operational state of the column 1000 during Time F in FIG. 9. As shown, the switches 320 corresponding to the offset sensor electrodes (also referred to herein as "offset switches" or "offset transistors") are opened while the switches 320 corresponding to the selected sensor electrodes 1010 are closed, thereby coupling the selected sensor electrodes 1010 to the sense line 330. As mentioned above, changing the state of the switches 320 can inject charge which is measured by the sensor module 204. The offset sensor electrode switches are used to compensate for the charge injection. In one embodiment, the amount of charge injected (or sunk) by activating the switches 320 corresponding to the selected sensor electrodes 1010 is such (or injected) by deactivating the offset switches 320 corresponding to the offset sensor electrodes 1005. Thus, the overall charge measured by the sensor module 204 due to toggling the switches 320 (e.g., the transistors) can be reduced to near zero.

In one embodiment, the amount of charge injected by a transistor may be different depending if the transistor is being activated (e.g., closed) or deactivated (e.g., opened). As such, the number of the sensor electrode in a column that are designated as offset sensor electrodes and selected sensor electrodes may be different. That is, the column may need to have a different number of offset sensor electrodes 1005 to sufficiently compensate for the charge injected by closing the switches 320 corresponding to the selected sensor electrodes 1010. However, in one embodiment, the column may have the same number of the offset sensor electrodes 1005 as the selected sensor electrodes 1010. In that case, the charge injection may be not completely balanced by the switches 320 but may be sufficiently balanced such that the injected charge does not prevent the sensor module 204 from accurately measuring the charge on the selected sensor electrodes 1010.

As mentioned above, instead of assigning electrodes in the column 1000 as offset sensor electrodes, in one embodiment, the columns 1000 in the array can include dedicated offset switches or offset transistors which are activated at Time F to compensate for the charge injected by the switches 320 coupled to the sensor electrodes. In one embodiment, the dedicated offset switches are used only for compensating for the charge injection from activating and/or deactivating the switches 320. Stated differently, the offset switches may not be coupled to sensor electrodes. As such, the offset switches can be disposed external to the layout 300 and the fingerprint sensor. In one embodiment, the offset switches are disposed in the processing system.

The dedicated offset switches are electrically coupled to the sense line 330. Thus, when the switches 320 are activated at Time F to connect the sensor electrodes to the sense line 330, the dedicated offset switches can be deactivated in order to compensate for the charge injected by the switches 320. As such, an input device that includes dedicated offset switches does not need the offset sensor electrodes 1005. That is, instead of having offset sensor electrodes where the charge is not measured during Time F, all of the sensor electrodes in the column 1000 can measured during the CDM cycles. In that case, each of the sensor electrodes in the column 1000 can be the selected sensor electrodes 1010. However, in one embodiment, the dedicated offset switches may be coupled to dummy offset sensor electrodes (i.e., sensor electrodes that are not used to perform capacitive sensing) since the load on the dedicated offset switches (e.g., the dummy offset sensor electrodes) effects the charge injected when activating or deactivating the offset switches. The dummy offset sensor electrodes do not need to be in an active area of the fingerprint sensor but can be disposed elsewhere.

At Time G, the sensor module 204 samples the charge in the selected sensor electrodes 1010. Because the offset switches 320 coupled to the offset sensor electrodes 1005 compensate for the charge injected by activating the switches 320 coupled to the selected sensor electrodes 1010, the remaining charge is mainly from the sensor electrodes 1010 and not from the charge injection of switches 320.

Although not shown in FIG. 9, when the demodulator signal changes at Times E and G, the sensor module 204 may capture multiple samples. For example, at Time E, the sensor module 204 may sample the charge on the offset sensor electrodes 1005 multiple times. Similarly, at Time G, the sensor module 204 can sample the total charge on the selected sensor electrodes 1010 any number of times. Furthermore, a continuous time sampling scheme may be used where the demodulator corresponds to a continuous time mixer.

In one embodiment, FIG. 9 is modified such that the voltage $V_{tx}$ on the drive line 335 only transitions between negative and positive voltages. That is, the voltage $V_{tx}$ does not stay at the reference voltage (e.g., ground). In this embodiment, the voltage $V_{tx}$ remains at +7.5V during Times D-G instead of changing to the reference voltage as shown. By keeping the voltage at the positive voltage during the remaining portion of the CDM cycle, the amount of charge injected via parasitic capacitances from drive line 335 to sense line 3430 by the positive voltage transition cancels the amount of charge injected by the negative voltage transition. That is, the effect of the transition in $V_{tx}$ from the negative to the positive voltage on the sensor module 204 cancels if the voltage remains at the positive voltage. As such, the op amp in the sensor module 204 does not need to be held at zero (e.g., the reset switch 405 does not need to be closed). As a result, the sensor module 204 may not need to use the reset switch 405 every cycle and may only need to use it once per burst. In one embodiment, the reset switch 405 is replaced by a DC feedback element such as a resistor to prevent the sensor module 204 from drifting.

Figure 11:
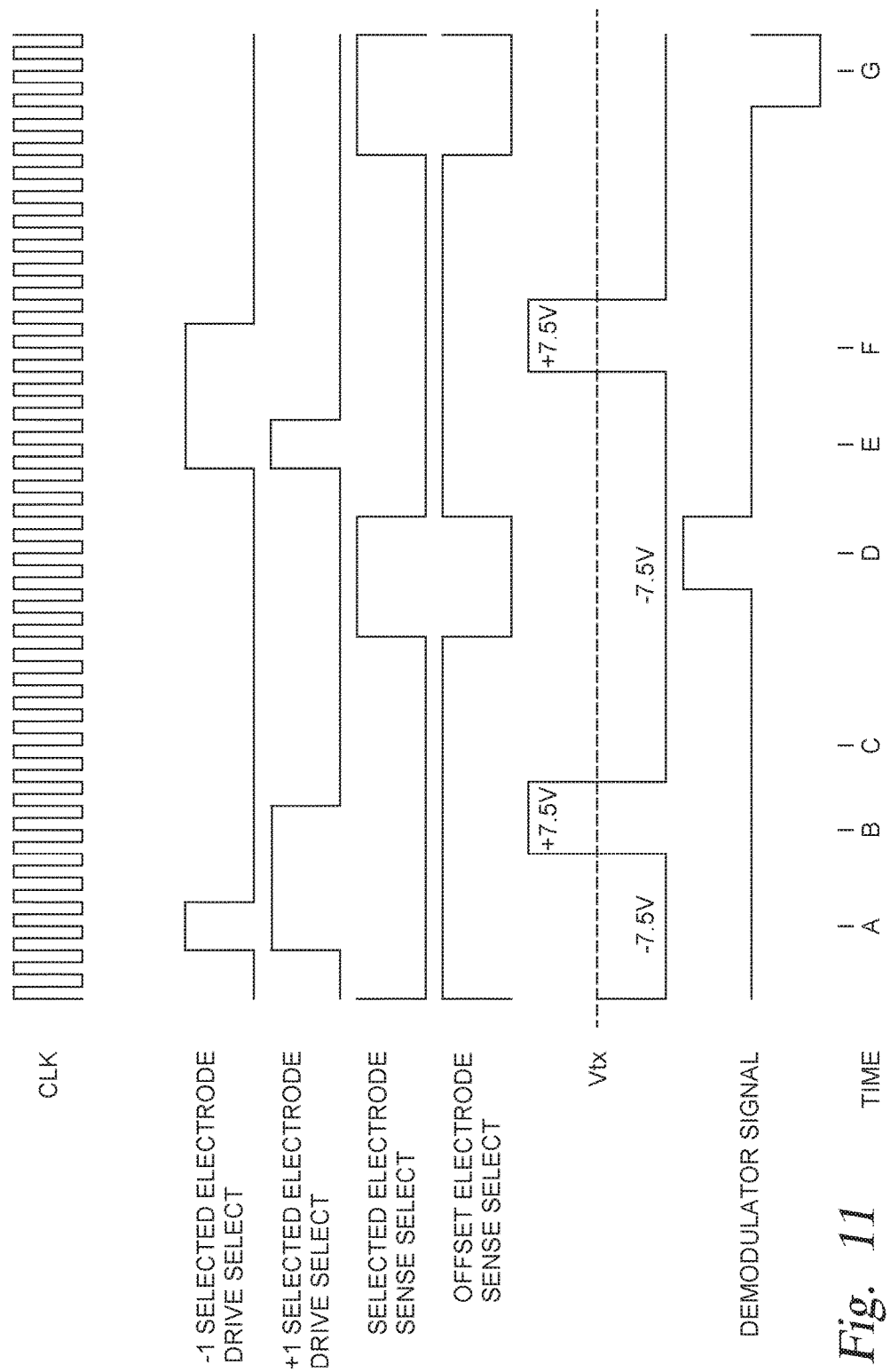
FIG. 11 illustrates a timing chart for using offset sensor electrodes when performing capacitive sensing in accordance with an embodiment of the invention.

FIG. 11 illustrates a timing chart for using offset sensor electrodes when performing capacitive sensing in accordance with an embodiment of the invention. The timing chart illustrates the signals for driving one of the columns in the sensor layout 300 in FIG. 3 where a plurality of sensor electrodes 315 can be selectively coupled to the same sensor module 204. Each of the columns in the layout 300 can be sensed in parallel using timing signals illustrated in FIG. 11. Moreover, the column includes at least one offset sensor electrode and at least one selected sensor electrode as discussed above. Further, like in FIG. 9, the functions described in FIG. 11 may be performed by the controller circuit 210 in the processing system 110. For example, the controller circuit 210 may include logic for controlling the gate lines, driving voltages onto the sensor electrodes, controlling the select lines, controlling the reset switch in the sensor module, etc.

At Time A in FIG. 11, the selected sensor electrodes are coupled to the drive line 335 such that the voltage $V_{tx}$ of −7.5V is driven onto these electrodes. That is, both the "−1" selected sensor electrodes and the "+1" selected sensor electrodes are driven to the negative voltage −7.5V. Moreover, the selected sensor electrodes are not coupled to the sense line 330. The offset sensor electrodes, in contrast, are not coupled to the drive line 335 but are coupled to the sense line 330 and to the sensor module 204.

At Time B in FIG. 11, the "−1" selected sensor electrodes are not coupled to the drive line 335 while the "+1" selected sensor electrodes remain coupled to the drive line 335. Thus, the voltage on the "+1" selected sensor electrodes is driven to the positive voltage 7.5V by the voltage $V_{tx}$.

At Time C, the selected sensor electrodes are no longer coupled to the drive line 335. Further, the selected sensor electrodes are not coupled to the sense line 330, and thus, are electrically floating. However, the "−1" selected sensor electrodes remain at the negative voltage −7.5V while the "+1" selected sensor electrodes are at the positive voltage 7.5V.

At Time D in FIG. 11, the selected sensor electrodes are coupled to the sense line 330 while the offset sensor electrodes are no longer coupled to the sense line 330. As shown by the demodulator signal, the input device uses the sensor module 204 to obtain one or more samples representing the charge on the selected sensor electrodes in the column. Further, the positive change in the demodulator signal indicates that the input device performs a positive demodulation on the resulting digital data obtained from the samples.

At Time E in FIG. 11, the selected sensor electrodes are disconnected from the sense line 330 and coupled to drive line 335, and as a result, are driven to the negative voltage −7.5V. At Time F, the "−1" selected sensor electrodes are driven to the positive voltage 7.5V while the "+1" selected sensor electrodes remain charged to the negative voltage −7.5V. Thus, the polarities of the voltages on the selected sensor electrodes are reversed relative to the voltages on the selected sensor electrodes at Time C.

At Time G, the selected sense electrodes are again coupled to the sense line 330 and the sum of the charge on the selected sense electrodes is sampled by the sensor module 204. The negative change in the demodulator signal indicates that the input device performs a negative demodulation on the resulting digital data obtained from the captured samples instead of performing a negative demodulation like at Time D.

FIG. 11 illustrates a CDM cycle that has an even portion (e.g., Times A-D) and an odd portion (e.g., times E-G). The even and odd portions can be considered to each be a positive and a negative half of a single CDM cycle.

During the even portion, the selected sensor electrodes are driven to respective voltages at Times A and B and then a positive demodulation is performed at Time D. During Times E and F in the odd portion, the selected sensor electrodes are driven to the opposite voltages and then a negative demodulation is performed at Time G. Doing so may remove or mitigate the charge injection caused by the switches 320 coupling the selected sensor electrodes to the sensor line 330.

In one embodiment, the switches 320 add charge regardless whether the voltage driven on the selected sensor electrodes is negative or positive. By performing both positive and negative demodulation, the charge added to the capacitive sensing measurement by the switches 320 during the even portion is subtracted by the charge added to the capacitive sensing measurement by the switches 320 during the odd portion. That is, when the results of performing the negative and positive demodulation are combined, the charge injected by the switches 320 in both of the even and odd portions in the CDM cycle cancels. In contrast, because the selected sensor electrodes were driven to opposite voltages, the measured charge on the sensor electrodes in the even and odd cycles combines to double the signal (i.e., the charge representing the capacitive coupling between the sensor electrodes and the input object does not cancel but instead adds when the demodulation results are combined).

Although the CDM cycle in FIG. 11 is divided into an odd portion and an even portion, the CDM cycle in FIG. 11 may result in capacitive sensing measurements with the same or better accuracy relative to the cycle shown in FIG. 9. In one embodiment, the two techniques described in FIGS. 9 and 11 can yield the same number of capacitive sensing measurement per unit of time. For example, the CDM cycle shown in FIG. 9 may be repeated 100 times while the odd and even portions of a CDM cycle shown in FIG. 11 may each be repeated 50 times, thus yielding the same number of capacitive sensing measurements in the same block of time as the technique illustrated in FIG. 9.

The offset sensor electrodes can perform a similar function in FIG. 11 as these electrodes did in FIG. 9. That is, the switches 320 coupled to the offset sensor electrodes are used to compensate for the charge injected by the switches 320 coupled to the selected sensor electrodes. Thus, in FIG. 11, using offset sensor electrodes and performing negative and positive demodulation can be used in combination to mitigate the negative effects of activating the switches 320 when coupling the selected sensor electrodes to the sense line 330. However, in another embodiment, the input device may not designate any of the sensor electrodes in the columns as offset sensor electrodes. Put differently, performing negative and positive demodulation as shown in FIG. 11 may be sufficient to mitigate the negative effects of charge injection, and thus, all the sensor electrodes in the column can be actively sensed—i.e., designated as selected sensor electrodes—in the CDM cycle. However, in other embodiments, the columns may include offset sensor electrodes to further improve the signal measured by the sensor module 204.

In one embodiment, when using the technique illustrated in FIG. 11, the reset switch may be only needed at the beginning of a burst or sensor module 204 may not need the reset switch 405 though some form of DC feedback may be used in its place, such as a resistor. That is, when dividing a CDM cycle into the even and odd portions using different polarity modulations, the sensor module 204 does not need to hold the offset sensor electrodes to ground. As such, unlike in FIG. 9, FIG. 11 does not include a RESET signal.

Figure 12:
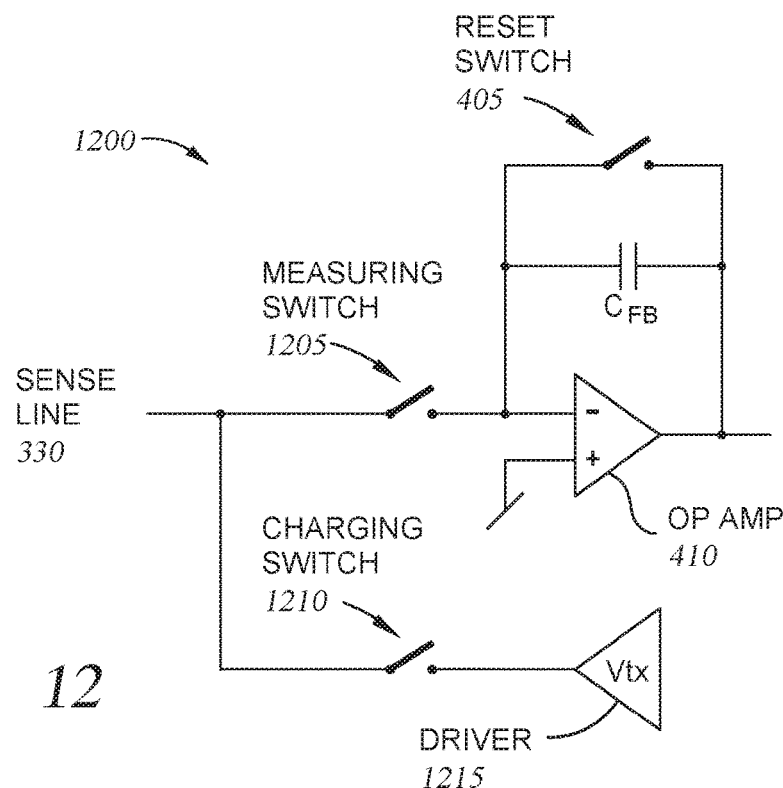
FIG. 12 illustrates a sensor module in accordance with an embodiment of the invention.

FIG. 12 illustrates a sensor module 1200 in accordance with an embodiment of the invention. Like the sensor module 204 illustrated in FIG. 3, the sensor module 1200 (or AFE) includes the op amp 410 with the feedback capacitor and the reset switch 405 in parallel feedback paths between the output of the op amp 410 and the inverting (−) input. In addition, the sensor module 1200 includes a measuring switch 1205 which selectively couples the inverting input of the op amp 410 to the sense line 330 and a charging switch 1210 which selectively couples a driver 1215 to the sense line 330.

When sampling the charge on the selected sensor electrodes, the measuring switch 1205 is closed while the charging switch 1210 is open, thereby coupling the op amp 410 to the sense line 330 and the selected sensor electrodes. However, when charging the selected sensor electrodes to the positive and negative voltages, the measuring switch 1205 is open while the charging switch 1210 is closed. For example, the driver 1215 can drive the +/−7.5V onto the in selected sensor electrodes as shown at Times B and C in FIG. 9 and Times A, B, E, and F in FIG. 11.

The advantage of adding the measuring switch 1205 and the charging switch 1210 to the AFE is that the drive lines 335, the drive select lines 310, and the switches 325 can be removed from FIG. 3. That is, instead of using the drive lines 335 to charge the selected sensor electrodes according to the voltage $V_{tx}$, this function can be performed using the charging switch 1210 and the driver 1215 shown in FIG. 12. Removing the switches 325 from the array can mean that that the drive line 335 and drive select lines 310 may be removed and that the sensor area may be increased, resulting in larger signal. It also reduces the number of select lines by half.

Figure 13:
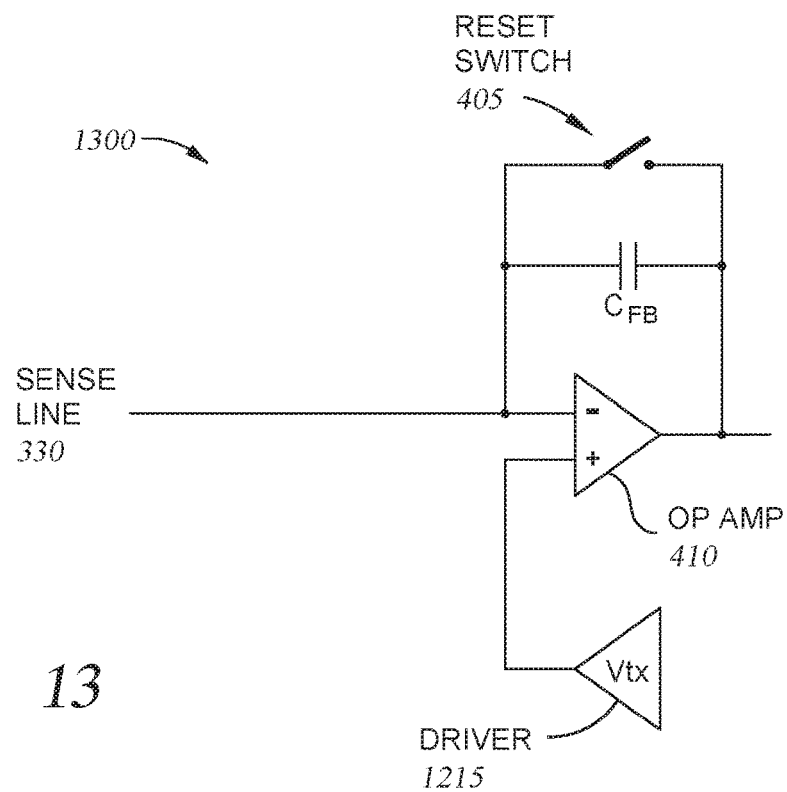
FIG. 13 illustrates a sensor module in accordance with an embodiment of the invention.

FIG. 13 illustrates a sensor module 1300 in accordance with an embodiment of the invention. The sensor module 1300 (or AFE) includes the reset switch 405, the feedback capacitor $C_{FB}$, the op amp 410, and the driver 1215 just like the sensor module 1200 in FIG. 12. However, the sensor module 1300 does not include the measuring switch 1205 and the charging switch 1210 although the sensor module 1300 can operate in a similar manner as the sensor module 1200. That is, when sampling the charge on the selected sensor electrodes, the driver 1215 is held to a reference voltage so that the output of the op amp 410 generates capacitive sensing measurements based on the total charge on the selected sensor electrodes coupled to the sense line 330. However, when charging the selected sensor electrodes to the positive and negative voltage, the driver 1215 can drive the +/−7.5V onto selected sensor electrodes as shown at Times B and C in FIG. 9 and Times A, B, E, and F in FIG. 11.

The advantage of the sensor module 1300 relative to the sensor module 1200 is the reduced cost and complexity by removing the measuring switch 1205 and the charging switch 1210. However, the voltage swing outputted by the driver 1215 to charge the selected sensor electrodes may be limited relative to using the sensor module 1200. Regardless of whether the sensor module 1200 is used or the sensor module 1300, the drive lines 335, the drive select lines 310, and the switches 325 can be omitted from the sensor layout 300.

In another embodiment, a third switch (e.g., a TFT transistor) can be coupled to each of the sensor electrodes 315 shown in FIG. 3. The other end of the third switch can be coupled to a second drive line (independent of the drive lines 335). Moreover, the gate of the third switches can be controlled by second drive select lines (independent of the drive select lines 305). The advantage of adding these components is that the input device can use one set of drive lines to drive the positive voltage $V_{tx}$ onto the selected sensor electrodes and the other set of drive lines to drive the negative voltage $V_{tx}$ onto the selected sensor electrodes. Because in this embodiment the voltages on the drive lines do not change, the reset switch 405 in the sensor module may not be needed or needed less frequently resulting in faster operation. In one embodiment, the reset switch 405 is replaced by a resistor or other circuit element which provides DC feedback.

The embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. A processing system for a fingerprint sensor, the processing system comprising:
a controller circuit configured to:
charge a first sensor electrode of a plurality of sensor electrodes to a first voltage, wherein the plurality of sensor electrodes are disposed in an array;
charge a second sensor electrode to a second voltage different from the first voltage, wherein the first and second voltages are assigned to the first and second sensor electrodes according to a code, and wherein the first sensor electrode and the second sensor electrode are disposed in a same column in the array;
after charging the first and second sensor electrodes, couple the first and second sensor electrodes simultaneously to a same analog front end (AFE) to sense a combined charge on the first and second sensor electrodes; and
determine a fingerprint based at least in part on the sensed combined charge on the first and second sensor electrodes.

2. The processing system of claim 1, wherein the controller circuit is configured to:
repeatedly charge the first and second sensor electrodes according to the code and generate multiple measurements of the combined charge using the same AFE,
wherein the processing system is configured to determine a first individual change in capacitance corresponding to the first sensor electrode and a second individual change in capacitance corresponding to the second sensor electrode using the multiple measurements of the combined charge.

3. The processing system of claim 2, wherein the code comprises an N number of combinations of driving the plurality of sensor electrodes to determine individual charges stored on an N number of the plurality of sensor electrodes.

4. The processing system of claim 1, wherein the first voltage is a positive voltage relative to a reference voltage and the second voltage is a negative voltage relative to the reference voltage.

5. The processing system of claim 4, wherein after sensing the combined charge of the first and second sensor electrodes, the controller circuit is configured to:
charge the first sensor electrode to the second voltage according to the code;
charge the second sensor electrode to the first voltage according to the code; and
after charging the first and second sensor electrodes to the second and first voltages, respectively, couple the first and second sensor electrodes simultaneously to the same AFE to sense a different combined charge on the first and second sensor electrodes.

6. An input device, comprising:
a plurality of sensor electrodes disposed in columns forming an array, wherein each of the columns comprises a sense line coupled to an AFE and respective transistors selectively coupling sensor electrodes in the column to the sense line; and
a processing system comprising an AFE coupled to the sense line, wherein the AFE is configured to:
charge a first sensor electrode in at least one of the columns to a first voltage;
charge a second sensor electrode in the at least one of the columns to a second voltage different from the first voltage; and
after charging the first and second sensor electrodes, measure a combined charge on the first and second sensor electrodes in parallel; and
wherein the processing system is configured to determine a fingerprint based at least in part on the measured combined charge on the first and second sensor electrodes.

7. The input device of claim 6, wherein the AFE comprises a first switch selectively coupling an operational amplifier to the sense line and a second switch selectively coupling a driver to the sense line, wherein the first switch is open and the second switch is closed when charging the first and second sensor electrodes and the first switch is closed and the second switch is open when measuring the combined charge.

8. The input device of claim 6, wherein the AFE comprises a driver coupled to a first input of an operational amplifier while the sense line is coupled to a second input of the operational amplifier, wherein the driver is configured to charge the first and second sensor electrodes to the first and second voltages using the operational amplifier and the sense line.

* * * * *

UNITED STATES PATENT AND TRADEMARK OFFICE
CERTIFICATE OF CORRECTION

PATENT NO. : 10,430,633 B2
APPLICATION NO. : 15/612250
DATED : October 1, 2019
INVENTOR(S) : Kirk Hargreaves, Arash Akhavan Fomani and Patrick Smith Page 1 of 1

It is certified that error appears in the above-identified patent and that said Letters Patent is hereby corrected as shown below:

In the Claims

In Column 30, Line 21, in Claim 6, after "line" delete "coupled to an AFE".

Signed and Sealed this
Twenty-fourth Day of November, 2020

Andrei Iancu
*Director of the United States Patent and Trademark Office*